United States Patent
Mambakkam et al.

(10) Patent No.: US 6,839,864 B2
(45) Date of Patent: Jan. 4, 2005

(54) FIELD-OPERABLE, STAND-ALONE APPARATUS FOR MEDIA RECOVERY AND REGENERATION

(75) Inventors: Sreenath Mambakkam, San Jose, CA (US); Larry Lawson Jones, Palo Alto, CA (US); Arockiyaswamy Venkidu, Menlo Park, CA (US)

(73) Assignee: OnSpec Electronic Inc., Santa Clara, CA (US)

( * ) Notice: Subject to any disclaimer, the term of this patent is extended or adjusted under 35 U.S.C. 154(b) by 0 days.

(21) Appl. No.: 10/253,547

(22) Filed: Sep. 23, 2002

(65) Prior Publication Data

US 2003/0041284 A1 Feb. 27, 2003

Related U.S. Application Data

(63) Continuation-in-part of application No. 10/064,967, filed on Sep. 4, 2002, and a continuation-in-part of application No. 10/167,925, filed on Jun. 11, 2002, which is a continuation of application No. 09/610,904, filed on Jul. 6, 2000, now Pat. No. 6,438,638.

(51) Int. Cl.$^7$ .............................................. G06F 11/00
(52) U.S. Cl. .......................................... 714/5; 711/159
(58) Field of Search ............................... 714/5, 6, 7, 8, 714/16, 27, 42, 47, 54, 39; 711/133, 134, 159; 707/200, 202

(56) References Cited

U.S. PATENT DOCUMENTS

| | | | | |
|---|---|---|---|---|
| 4,092,732 A | * | 5/1978 | Ouchi | 714/5 |
| 5,485,606 A | * | 1/1996 | Midgdey et al. | 707/10 |
| 5,717,951 A | * | 2/1998 | Yabumoto | 710/11 |
| 5,844,911 A | * | 12/1998 | Schadegg et al. | 714/710 |
| 5,961,652 A | * | 10/1999 | Thompson | 714/6 |
| 6,173,291 B1 | * | 1/2001 | Jenevein | 707/200 |
| 6,658,202 B1 | * | 12/2003 | Battaglia et al. | 386/117 |

* cited by examiner

Primary Examiner—Nadeem Iqbal
(74) Attorney, Agent, or Firm—Blakely, Sokoloff, Taylor & Zafman LLP

(57) ABSTRACT

A field-operable stand-alone apparatus for recovering data from corrupted flash media and regenerated damaged flash media. The apparatus enables users in the field to recover data from and/or regenerate damaged flash media without requiring the use of a computer. In one aspect, recovery comprises using a low-level access scheme that enables data to be recovered when high-level interfaces, such as file systems, are damaged. The type of flash media is determined, and a corresponding access scheme is employed. Depending on the type of damage to the media, a physical-to-logical table may be built and employed to sequentially access the flash media in search of indicia from which selectable file-types can be identified, or the media may be accessed using normal operating system commands. Once the file indicia are found, the location of corresponding file data is identified, whereupon the file data are read and stored. The apparatus may include a plurality of different connectors to interface with different media form factors, or a universal connector that employs various form-factor adaptors to interface with the different flash media configurations.

18 Claims, 21 Drawing Sheets

| Pin | CF | Smart Media | MMC/SD | Memory Stick |
|---|---|---|---|---|
| 1 | Ground | Ground | Ground | Ground |
| 2 | D3 | D3 | --- | --- |
| 3 | D4 | D4 | --- | --- |
| 4 | D5 | D5 | --- | --- |
| 5 | D6 | D6 | --- | --- |
| 6 | D7 | D7 | --- | --- |
| 7 | -CE1 | -SMCS | --- | --- |
| 8 | A10 | --- | --- | --- |
| 9 | -OE | -OE | --- | --- |
| 10 | A9 | --- | --- | --- |
| 11 | A8 | --- | --- | --- |
| 12 | A7 | --- | --- | --- |
| 13 | Power | Power | Power | Power |
| 14 | A6 | CLE | | |
| 15 | A5 | ALE | | |
| 16 | A4 | READY | | |
| 17 | A3 | -WP | | |
| 18 | A2 | LVD | SCLK | SCLK |
| 19 | A1 | | DIO | DIO |
| 20 | A0 | | CMD | BS |
| 21 | D0 | D0 | | |
| 22 | D1 | D1 | | |
| 23 | D2 | D2 | | |
| 24 | --- | --- | --- | --- |
| 25 | -CD2 | -CD2 | -CD2 | -CD2 |
| 26 | -CD1 | -CD1 | -CD1 | -CD1 |
| 27 | D11 | --- | --- | --- |
| 28 | D12 | --- | --- | --- |
| 29 | D13 | --- | --- | --- |
| 30 | D14 | --- | --- | --- |
| 31 | D15 | --- | --- | --- |
| 32 | -CE2 | --- | --- | --- |
| 33 | --- | --- | --- | --- |
| 34 | tie high | --- | --- | --- |
| 35 | tie high | --- | --- | --- |
| 36 | -WE | -WE | --- | --- |
| 37 | INTRQ | --- | --- | --- |
| 38 | Power | Power | Power | Power |
| 39 | --- | --- | --- | --- |
| 40 | --- | --- | --- | --- |
| 41 | RESET | --- | --- | --- |
| 42 | --- | --- | --- | --- |
| 43 | --- | --- | --- | --- |
| 44 | -REG | --- | --- | --- |
| 45 | --- | --- | --- | --- |
| 46 | --- | --- | --- | --- |
| 47 | D8 | --- | --- | --- |
| 48 | D9 | --- | --- | --- |
| 49 | D10 | --- | --- | --- |
| 50 | Ground | Ground | Ground | Ground |

*Fig. 5*

Table 1. Block Details of SmartMedia

| Size (MB) | MBR Page number | DBR Page Number | Number of Pages per Block | MBR as a Block Number | DBR as a Block Number | Root Directory Area as a Block Number | Start of Data Area as a Block Number |
|---|---|---|---|---|---|---|---|
| 1 | 0 | 13 | 8 | 0 | 1 | 2 | 4 |
| 2 | 0 | 11 | 8 | 0 | 1 | 2 | 4 |
| 4 | 0 | 27 | 16 | 0 | 1 | 2 | 3 |
| 8 | 0 | 25 | 16 | 0 | 1 | 2 | 3 |
| 16 | 0 | 41 | 32 | 0 | 1 | 1 | 2 |
| 32 | 0 | 35 | 32 | 0 | 1 | 1 | 2 |
| 64 | 0 | 55 | 32 | 0 | 1 | 2 | 3 |
| 128 | 0 | 47 | 32 | 0 | 1 | 2,3 | 4 |
| 256 | 0 | 47 | 32 | 0 | 1-4 | 5 | 6 |

*Fig. 21*

Table 2. Block Details of Memory Stick

| Size (MB) | MBR Page number | DBR Page Number | Number of Pages per Block | MBR as a Block Number | DBR as a Block Number | Root Directory Area as a Block Number | Start of Data Area as a Block Number |
|---|---|---|---|---|---|---|---|
| 4 | 0 | 27 | 16 | 2 | 3 | 4,5 | 6 |
| 8 | 0 | 25 | 16 | 2 | 3 | 4,5 | 6 |
| 16 | 0 | 25 | 32 | 2 | 2 | 3 | 4 |
| 32 | 0 | 19 | 32 | 2 | 2 | 3 | 4 |
| 64 | 0 | 7 | 32 | 2 | 2 | 3 | 4 |
| 128 | 0 | 33 | 32 | 2 | 3,4 | 5 | 6 |

*Fig. 22*

FIELD-OPERABLE, STAND-ALONE APPARATUS FOR MEDIA RECOVERY AND REGENERATION

CROSS-REFERENCE TO RELATED APPLICATIONS

The present invention is a continuation-in-part of U.S. patent application Ser. No. 10/064,967, filed on Sep. 4, 2002, entitled "SOFTWARE RECOVERY METHOD FOR FLASH MEDIA WITH DEFECTIVE FORMATING," and U.S. patent application Ser. No. 10/167,925, filed on Jun. 11, 2002, entitled "FLASHTOASTER FOR READING SEVERAL TYPE OF FLASH MEMORY CARDS WITH OR WITHOUT A PC," which is a continuation of 09/610,904 filed on Jul. 6, 2000 now U.S. Pat. No. 6,438,638, issued Aug. 20, 2002, entitled "FLASHTOASTER FOR READING SEVERAL TYPE OF FLASH MEMORY CARDS WITH OR WITH OUT A PC, " the specification and drawings of each of which are incorporated y reference herein in their entirety.

REFERENCE TO COMPUTER PROGRAM LISTING APPENDIX

A computer program listing including details of various application program interface (API) commands employed by embodiments of the present invention have been submitted herewith on a compact disc. The materials are incorporated by reference herein in accordance with CFR 37 § 1.52(e)(5). The compact disc contains a single file entitled "API Listing.txt", created on Aug. 27, 2002, file size 37.0 KB.

FIELD OF THE INVENTION

The field of the invention relates generally to flash media and, more specifically but not exclusively to a stand-alone apparatus for recovering data from defectively-formatted flash media and regenerating the same.

BACKGROUND INFORMATION

Digital cameras typically capture images electronically and ultimately store the images as bits (ones and zeros) on a solid-state memory. Flash memory is the most common storage for digital cameras. Flash memory contains one or more electrically-erasable read-only-memory (EEPROM) integrated circuit chips that allow reading, writing, and block erasing.

Early digital cameras required the user to download or transfer the images from the flash memory within the digital camera to a personal computer (PC). A standard serial cable was most widely used. However, the limited transfer rate of the serial cable and the large size of the digital images made such serial downloads a patience-building experience. Serial downloads could easily take half an hour for only a few dozen images.

Digital camera manufacturers solved this problem by placing the flash memory chips on a small removable card. The flash-memory card could then be removed from the digital camera, much as film is removed from a standard camera. The flash-memory card could then be inserted into an appropriate slot in a PC, and the image files directly copied to the PC.

FIG. 1A shows a conventional scheme in which a flash memory card and adapter are employed for transferring images from a digital camera to a PC. Generally, digital camera 14 will employ a flash memory card containing one or more flash memory chips that are used to store data pertaining to images taken by users of the camera. In the illustrated example, the flash memory chip(s) are contained in a CompactFlash™ card 16 (CompactFlash is a trademark of SanDisk Corp. of Sunnyvale, Calif.), which can be removed from digital camera 14 by pressing a card-eject button.

Typically, laptop and notebook computers have one or more PC-card (earlier known as PCMCIA, Personal Computer Memory Card International Association) slots that can receive PCMCIA cards. In this conventional scheme, a CF-to-PCMCIA adapter 10 is employed to enable a PC or laptop computer to read data stored on CompactFlash card 16 as if it were stored on a PCMCIA card. As shown in FIG. 1A, CF-to-PCMCIA adapter 10 contains a connector interface disposed in an opening that receives CompactFlash card 16. FIG. 1B shows CF-to-PCMCIA adapter 10 with CompactFlash card 16 inserted.

As shown in FIG. 1C, a computer such as notebook PC 20 can read data stored on a PCMCIA card via either a PCMCIA reader 12 connected to the PC via a parallel or USB cable, or directly via a built-in PCMCIA slot 22. Once the PCMCIA is inserted into the reader or the PCMCIA slot, the user merely has to copy the image files from CompactFlash card 16 to the hard disk of PC 20. Since high-speed parallel buses are used, transfer is rapid, about the same speed as accessing the hard disk. This greatly enhances the transfer speed when compared with the serial cable link discussed above.

Although the CompactFlash card format is relatively small, being not much more than an inch square, other smaller cards have recently emerged. For example, several of such smaller flash media cards are shown in FIG. 2A, including a SmartMedia™ (SmartMedia is a trademark of the SSFDC Forum of Tokyo, Japan).card 24, which is less than half an inch long, yet has enough flash memory capacity for dozens of images. The SmartMedia card may be read in a manner similar to that discussed above with a SmartMedia-to-PCMCIA adapter 10'. Depending on the manufacturer and card capacity, different adapters 10' may be required for different memory capacities of SmartMedia card 24.

Other kinds of flash-memory cards that are being championed by different manufacturers include MultiMediaCard™ (MMC) 28 and the related Secure Digital Card (SD) 26. MMC is a trademark of SanDisk Corp. of Sunnyvale, Calif. while SD is controlled by the SD Group that includes Matsushita Electric Industrial Co., SanDisk Corporation, Toshiba Corp. Another emerging form factor from Sony is Memory Stick 18. Typically, memory stick devices may be read using a PCMCIA/Floppy adapter while MMC may be read with a floppy adapter.

The different physical shapes and pin arrangements of cards 24, 26, 28 and Memory Stick 18 prevent their use in CF-to-PCMCIA adapter 10. Indeed, most of these cards 24, 26, 28 have less than a dozen pins, while CompactFlash card 16 has a larger 50-pin interface. Furthermore, serial data interfaces are used in the smaller cards 24, 26, 28, while a parallel data bus is used with CompactFlash card 16.

FIG. 2B shows a Memory Stick-to-PCMCIA adapter that includes an active converter chip 11. Memory Stick 18 fits into an opening in Memory Stick-to-PCMCIA adapter 15, allowing adapter 15 and the Memory Stick to be plugged into a standard PCMCIA slot on a PC in a manner similar to CF-to-PCMCIA adapter 10. However, rather than providing a passive adaptor function, adapter 15 employs active converter chip 11 to convert the serial data format of Memory Stick 18 to the parallel data format of a 68-pin PCMCIA slot. Inclusion of converter chip 11 in adapter 15 significantly increases the cost and complexity of adapter 15 compared to CF-to-PCMCIA adapter 10.

While the advances in flash-memory card technology are useful, the many different card formats present a confusing array of interface requirements to a PC. Different adapters are needed for each of the card formats. PCMCIA card reader 12 can be replaced with other format readers, such as a SmartMedia Card reader, and even some multi-standard readers are available, such as a universal reader from Lexar Media that reads CompactFlash or SmartMedia in addition to PCMCIA.

Occasionally, a user may remove a flash media from a host device, such as a digital camera, PDA (Personal Digital Assistant), MP3 player, etc., while the host device is reading to or writing from the card. Media card removal, particularly during the writing, but also sometimes during the reading, may destroy the card formatting, resulting, in most cases, in making the data unreadable by the host and possibly other interfacing devices. In addition, flash media card formatting and file information may become corrupted or lost due to other causes, such as power failure during read or write operations, faulty programs, faulty host device or reader, high level "erasing" of files by a user, who later wants to recover such files, or other causes. As a result, the content on the card cannot be read and/or accessed.

Currently, there exists techniques for recovering data from such media through use of a computer and (generally) some time of flash media "reader" or other type of flash media interface device. However, when someone is using a device that stores data on flash media in the field, such as a tourist using a digital camera on an overseas trip, the user may not have access to a computer and/or reader. What is clearly needed is a field-operable, stand-alone apparatus that allows the regeneration and recovery of corrupted media of all types, without having to rely on the availability of a computer or reader. Furthermore, it would be advantageous if such a apparatus could read a variety of different card formats.

SUMMARY OF THE INVENTION

In accordance with aspects of the present invention a field-operable stand-alone apparatus for recovering data from corrupted flash media and regenerated damaged flash media. The apparatus enables users in the field to recover data from and/or regenerate damaged flash media without requiring the use of a computer. In one aspect, recovery comprises using a low-level access scheme that enables data to be recovered when high-level interfaces, such as file systems, are damaged. The type of flash media is determined, and a corresponding access scheme is employed. Depending on the type of damage to the media, a physical-to-logical table may be built and employed to sequentially access the flash media in search of indicia from which selectable file-types can be identified, or the media may be accessed using normal operating system commands. Once the file indicia are found, the location of corresponding file data is identified, whereupon the file data are read and stored. The apparatus may include a plurality of different connectors to interface with different media form factors, or a universal connector that employs various form-factor adaptors to interface with the different flash media configurations.

In another aspect of the invention, the apparatus comprises a hand-held apparatus that may be easily carried for use in the field, such as when traveling or generally away from a user's home or office. The apparatus may be used to recover data from corrupted media, and store the data in built-in persistent memory or write the data to removable media, such as a floppy disk, CD-ROM, Iomega disk, Zip disk, or the like. The apparatus is capable of recovering data from corrupted flash media, temporarily storing the data, regenerate (e.g., reformat, repair file system, etc.) the corrupted flash media, and write the data back to the regenerated flash media, thereby enabling it to be used immediately.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a table of pin mappings for the SmartMedia, MMC/SD, and Memory Stick to CompactFlash adapters;

FIG. 14 is a continuation of the flowchart of FIG. 11 illustrating operations and logic performed when reading data corresponding to previously inaccessible files, such as picture files and the like;

FIGS. 21 and 22 respectively show tables containing parameters specific to SmartMedia and Memory Stick type media that are used during media regeneration operations.

DETAILED DESCRIPTION OF PREFERRED EMBODIMENTS

Embodiments of apparatus for recovering data from and regenerating corrupted flash media are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, details for making and using a field-operable stand-alone apparatus for recovering data from damaged flash media and regenerated such damaged flash media are disclosed herein. Included among these aspects, is the ability of embodiments of the apparatus to enable recovery from and regeneration of various types of flash media. In one embodiment, this is enabled via use of a universal flash media adapter.

Figure 3A:
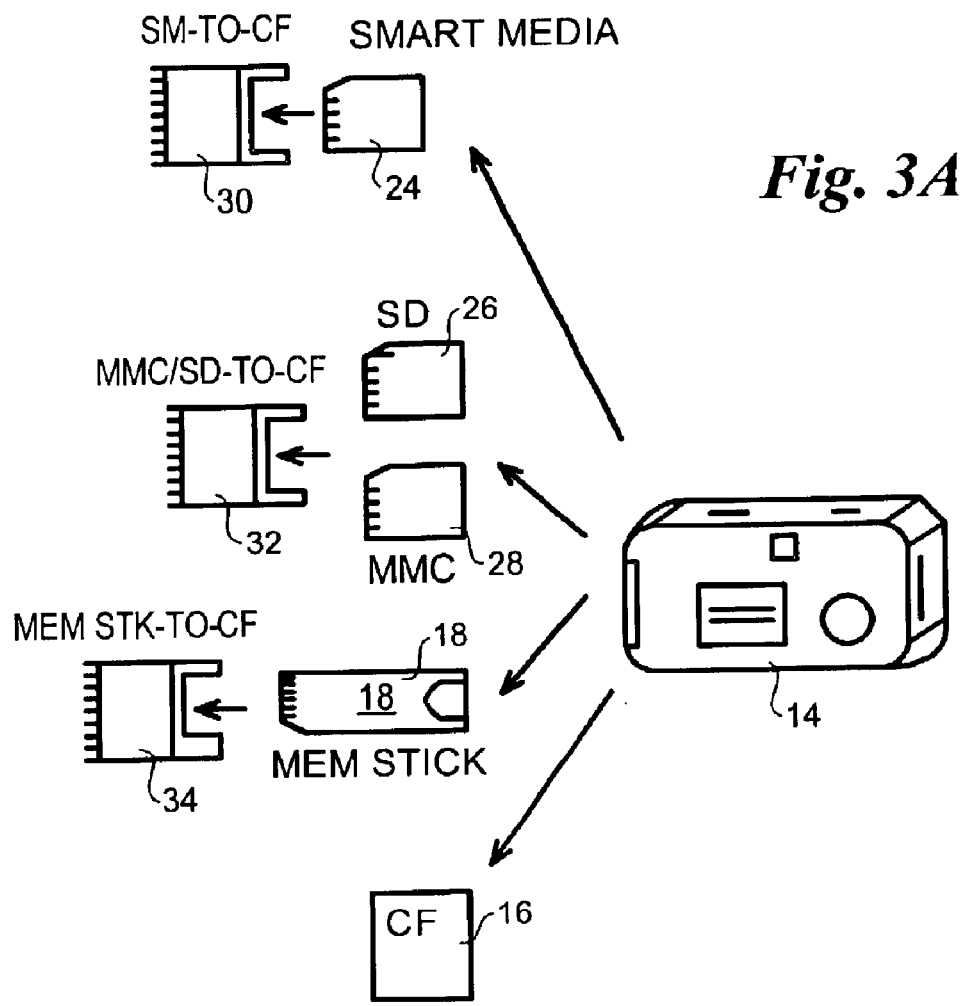
FIG. 3A shows a universal CompactFlash adapter that accepts SmartMedia, MultiMediaCard, Secure Digital, and Memory Stick flash-memory cards.

For example, FIG. 3A shows a universal CompactFlash adapter that accepts SmartMedia, MultiMediaCard, Secure Digital, and Memory Stick flash-memory cards. Digital camera 14 stores images on flash memory that is in one of several card types. CompactFlash card 16 uses a 50-pin connector and transfers image data in a 16-bit parallel format.

SmartMedia card 24 comprises a smaller flash-memory card with a 22-pin interface and transfers data in an 8-bit parallel format. SmartMedia adapter 30 converts the 22-pin SmartMedia interface to fit within the 50-pin CompactFlash interface. When SmartMedia card 24 is plugged into SmartMedia adapter 30, both can be plugged into a CompactFlash slot on a CompactFlash reader. Of course, ordinary CompactFlash readers will not be able to read SmartMedia card 24 since special signal conversion is required by the CompactFlash reader.

MultiMediaCard 28 and Secure Digital card 26 are flash-memory cards with similar 9-pin interfaces. Serial data transfer is used through a single Data I/O pin. MMC/SD adapter 32 has an opening with a 9-pin connector to receive either MultiMediaCard 28 or Secure Digital card 26. Once MultiMediaCard 28 or Secure Digital card 26 is inserted into MMC/SD adapter 32, the MMC/SD adapter 32 can be inserted into a CompactFlash slot on a special CompactFlash reader. The CompactFlash reader then detects the card type and performs serial-to-parallel conversion.

Memory Stick 18 is also a flash-memory card with a 9-pin, serial-data interface, but is narrower and longer than MultiMediaCard 28 or Secure Digital card 26. Memory Stick adapter 34 has an opening with a 10-pin connector to receive Memory Stick 18. Once Memory Stick 18 is inserted, Memory Stick adapter 32 can itself be inserted into a CompactFlash slot on a special CompactFlash reader. The CompactFlash reader then detects the card type and performs serial-to-parallel conversion.

Figure 3B:
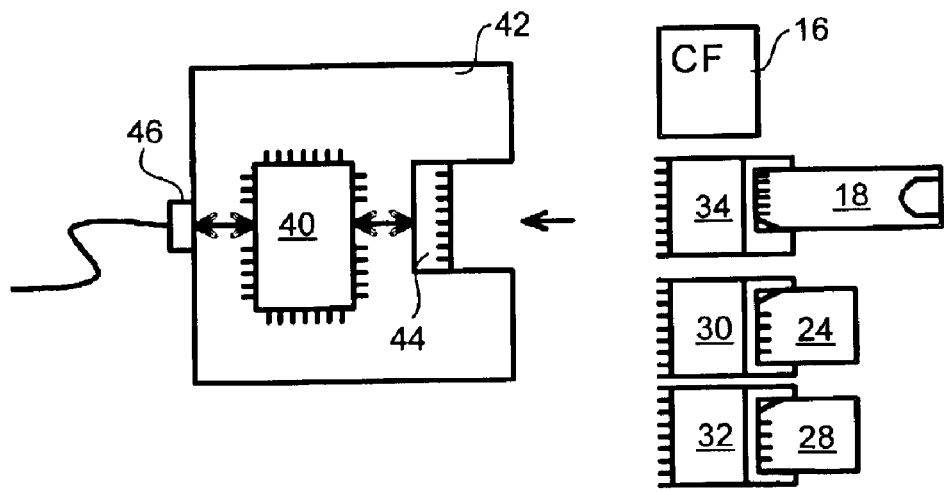
FIG. 3B shows a CompactFlash reader that reads SmartMedia, MultiMediaCard, Secure Digital, and Memory Stick flash-memory cards through passive adapters to the CompactFlash form factor.

FIG. 3B shows a CompactFlash reader that reads SmartMedia, MultiMediaCard, Secure Digital, and Memory Stick flash-memory cards through passive adapters to the CompactFlash form factor. CompactFlash reader 42 has an opening or slot with 50-pin connector 44 that accepts CompactFlash card 16. Controller chip 40 performs handshaking with CompactFlash card 16 and performs data transfer. CompactFlash reader 42 also connects to a PC over USB connector 46. Controller chip 40 also controls the USB interface to the host PC, allowing image files to be transferred to the PC from CompactFlash card 16.

Other kinds of flash-memory cards can also be read by CompactFlash reader 42. For example, adapter 34 allows Memory Stick 18 to be read. Memory Stick adapter 34 has an opening that Memory Stick 18 fits into, while Memory Stick adapter 34 itself fits into 50-pin connector 44, since adapter 34 has the same form factor as a CompactFlash card. SmartMedia card 24 can also be read by CompactFlash reader 42, using SmartMedia adapter 30. Likewise, MultiMediaCard 28 or Secure Digital card 28 can be read using MMC/SD adapter 32.

Adapters 30, 32, 34 are passive adapters that only connect pins from the smaller flash-memory cards to the 50-pin CompactFlash connector. An active converter chip is not required, greatly reducing cost and complexity.

FIGS. 4A–E detail detection of the type of flash-memory card by the CompactFlash reader. Since the same CompactFlash slot is used for many kinds of flash-memory cards, a detection method is useful so that the user doesn't have to explicitly indicate what type of flash-memory card is inserted into the CompactFlash reader.

The inventors have carefully examined the pins of the interfaces to the various flash-memory cards and have discovered that type-detection can be performed by examining two address pins. Address pins A0 and A1 are the least-significant-bits (LSB) of the address of the 50-pin CompactFlash interface. These pins are normally inputs to the CompactFlash card and thus are driven by the CompactFlash reader. When the reader does not drive A0, A1 to the inserted CompactFlash card, the A0, A1 pins float or are pulled high by pullup resistors.

Address pins are not present on the other kinds of flash-memory cards. Instead, the address and data are multiplexed. For MMC/SD and Memory Stick, the address is sent serially. Using the adapters, pins from the other flash-memory cards can be connected to the CompactFlash pins. Pins A0 and A1 are used to detect the type of card. For SmartMedia, the addresses are sent by using a special control sequence followed by 3 or 4 bytes of starting address.

Figure 4A:
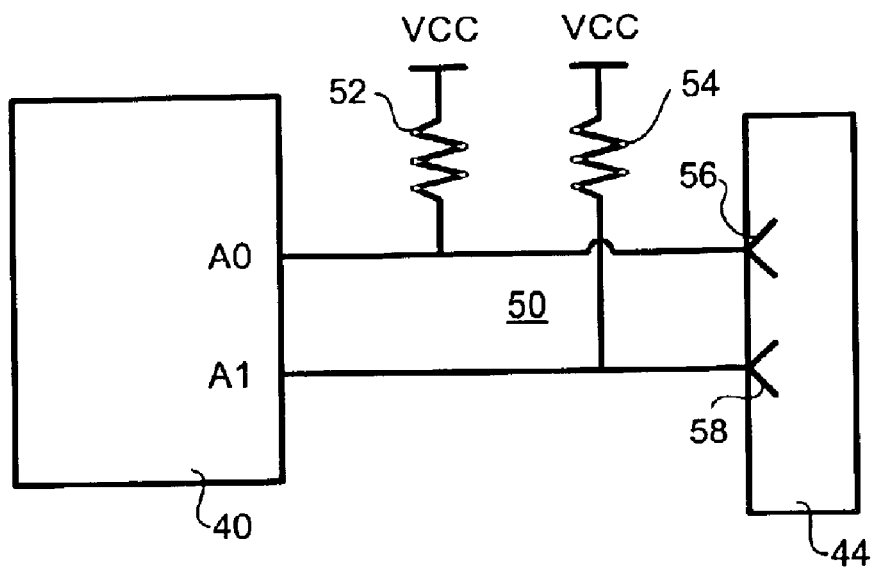
FIGS. 4A–E show card-type detection using the A1, A0 pins of the CompactFlash reader interface.

In FIG. 4A, the A1, A0 pins of the CompactFlash reader interface are highlighted. Converter chip 40 in the CompactFlash reader normally drives all 11 address pins in the CompactFlash interface when reading a CompactFlash card plugged into connector 44. The A0 pin from the CompactFlash card plugs into connector cup 56, while the A1 pin from the CompactFlash card plugs into connector cup 58 of 50-pin connector 44.

Card-type detector 50 has two pullup resistors added to lines A0, A1. Resistor 52 pulls line A0 high to power (Vcc) when neither converter chip 40 nor a card plugged into connector 44 drives line A0. Likewise, resistor 54 pulls line A1 high when line A1 is not being actively driven. During detection mode, converter chip 40 is programmed to not drive lines A0, A1 and instead use then as inputs to the detector logic.

Figure 4B:
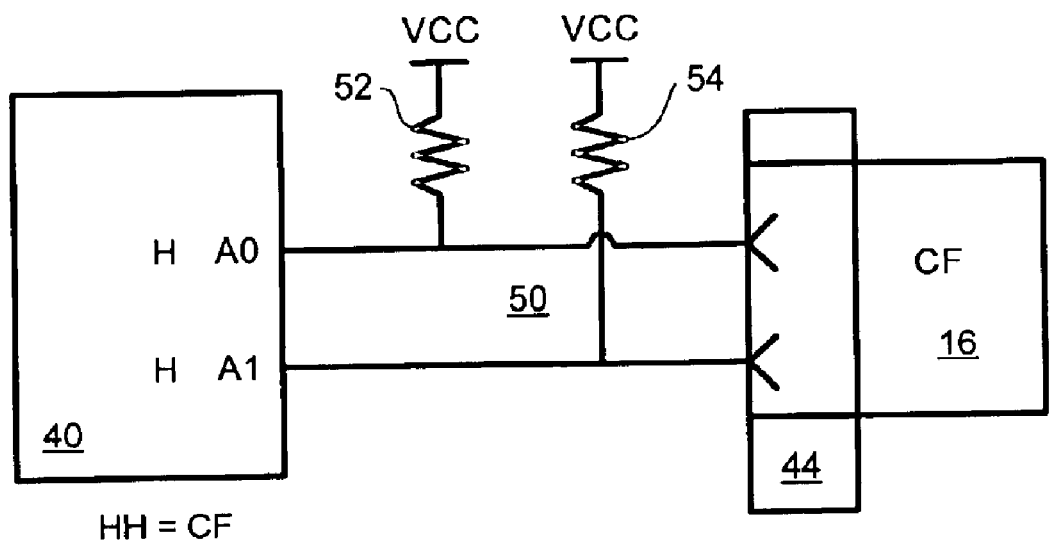

In FIG. 4B, a CompactFlash card is inserted into the connector for card-type detection. CompactFlash card 16 is plugged into connector 44. Since A0 and A1 are inputs to CompactFlash card 16, they are not driven by CompactFlash card 16. During detection mode, converter chip 40 also does not drive pins A0, A1. Thus lines A0, A1 are left floating and are each pulled high by resistors 52, 54.

Detection logic in converter chip 40 reads card-select pins CD0, CD1 to detect the presence of a flash-memory card. When a new card is present, detection logic then reads pins A0, A1 as inputs. Both inputs are high. The detection logic in converter chip 40 recognizes the HH state of A0, A1 as indicating that a CompactFlash card is plugged into connector 44. Converter chip 40 then exits detection mode and configures its interface to connector 44 for the 50-pin CompactFlash interface as shown later in FIG. 5.

Figure 4C:
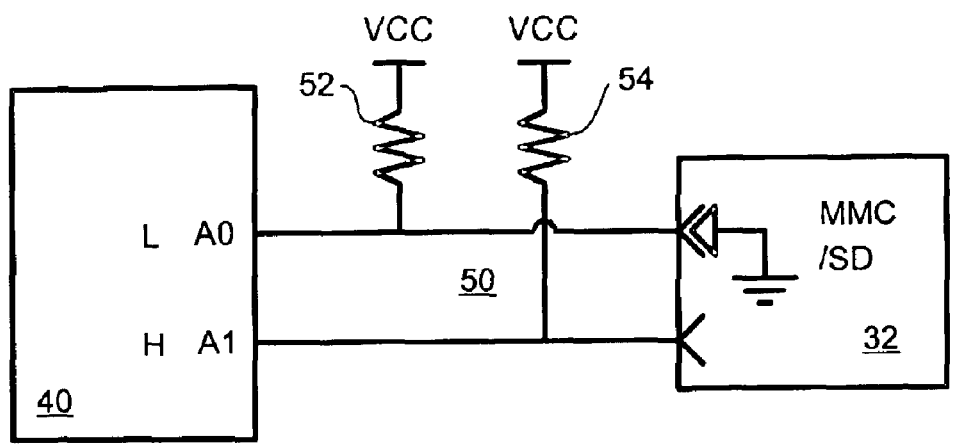

In FIG. 4C, a MultiMediaCard or Secure Digital card is inserted into the connector for card-type detection. MMC/SD card 28 (not shown) is plugged into MMC/SD adapter 32 which is plugged into connector 44. Converter chip 40 does not drive pins A1, A0 during detection mode. Thus pin A1 floats and is pulled high by resistor 54. The A0 pin is driven low by the MMC card.

Detection logic in converter chip 40 reads card-select pins CD0, CD1 to detect the presence of a flash-memory card. When a new card is present, detection logic then reads pins A0, A1 as inputs. While A0 is low, A1 is high. The detection logic in converter chip 40 recognizes the LH state of A0, A1 as indicating that a MMC or SD card is plugged into connector 44. Converter chip 40 then exits detection mode and configures its interface to connector 44 for the 9-pin MMC/SD interface as shown later in FIG. 5.

Figure 4D:
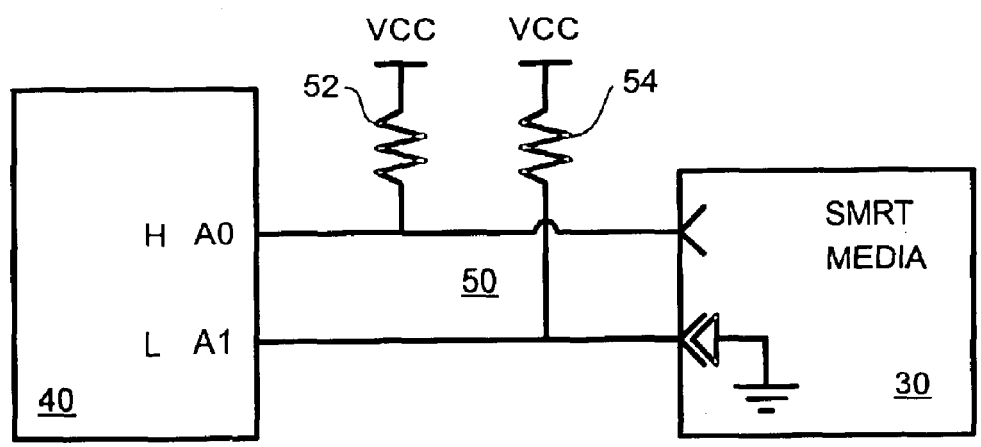

In FIG. 4D, a SmartMedia card is inserted into the connector for card-type detection. SmartMedia card 24 (not shown) is plugged into SmartMedia adapter 30 which is plugged into connector 44. The adapter 30 does not connect pins A0, A1 from the CompactFlash interface to any pins on the SmartMedia card. Adapter 30 internally connects pin A1 from the CompactFlash interface to the ground pin on the CompactFlash interface. The SmartMedia card does not drive either pin A1, A0, although adapter 30 drives pin A1 low. Likewise, converter chip 40 does not drive pins A1, A0 during detection mode. Pin A0 floats and is pulled high by resistor 52.

Detection logic in converter chip 40 reads card-select pins CD0, CD1 to detect the presence of a flash-memory card. When a new card is present, detection logic then reads pins A0, A1 as inputs. While A0 is high, A1 is low. The detection logic in converter chip 40 recognizes the HL state of A0, A1 as indicating that a SmartMedia card is plugged into connector 44. Converter chip 40 then exits detection mode and configures its interface to connector 44 for the 22-pin SmartMedia interface as shown later in FIG. 5.

Figure 4E:
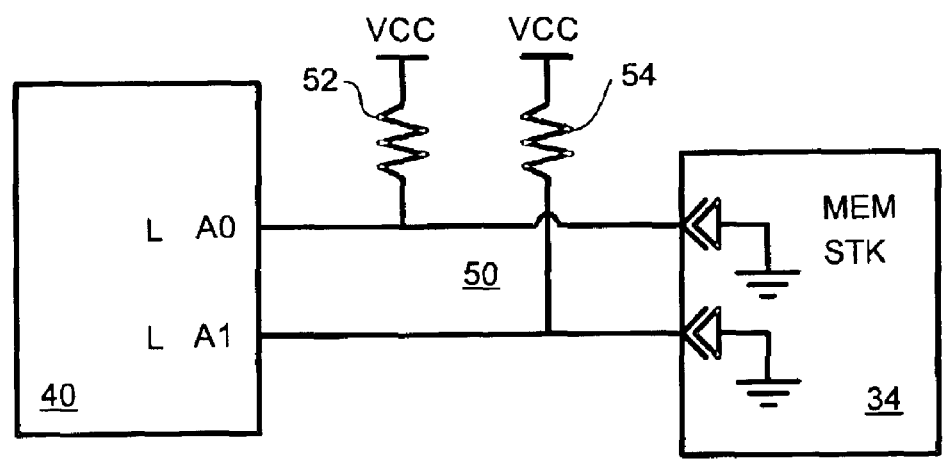

In FIG. 4E, a Memory Stick card is inserted into the connector for card-type detection. Memory Stick card 18 (not shown) is plugged into Memory Stick adapter 34 which is plugged into connector 44. Detection logic in converter chip 40 reads card-select pins CD0, CD1 to detect the presence of a flash-memory card. When a new card is present, detection logic then reads pins A0, A1 as inputs. Both pins A0, A1 are low. The detection logic in converter chip 40 recognizes the LL state of A0, A1 as indicating that a Memory Stick card is plugged into connector 44.

FIG. 5 is a table of pin mappings for the SmartMedia, MMC/SD, and Memory Stick to CompactFlash adapters. The pin numbers for the smaller interfaces for SmartMedia, MMC/SD, and Memory Stick are not shown but can be in any order or designation. The adapter connects the proper pin on the smaller interface to the CompactFlash pin number shown in FIG. 5. Simple wiring such as individual wires, flat cables, printed-circuit board (PCB), or wiring traces can be used.

The ground pins on the smaller interfaces are connected to CompactFlash pins 1 and 50. Power pins are connected to CompactFlash pins 13, 38. Pins 25, 26 are the card detect signals for CompactFlash, which the adapters connect to the card-detect signals on all smaller interfaces.

The CompactFlash connectors use pins 2–6, 21–23, 27–31, and 47–49 for the 16-bit parallel data bus to the CompactFlash card. Pins 8, 10–12, and 14–20 form a separate 11-bit address bus. The separate data and address buses provide for rapid random addressing of CompactFlash cards. Other control signals include pins 6, 32 chip enables, pin 9 output enable, pin 36 write enable, interrupt pin 37, reset pin 41, and register REG pin 44. REG pin 44 is the Attribute Memory Select, defined based on the CF mode of operation, i.e. PCMCIA I/O mode, IDE or PCMCIA Memory Mode.Several pins in the 50-pin interface are not connected.

The smaller SmartMedia interface also has a parallel data bus of 8 bits. These are mapped to pins 2–6, and 21–23 of the CompactFlash interface to match the CompactFlash D0:7 signals. While no separate address bus is provided, address and data are multiplexed. Control signals for latch enables, write enable and protect, output enable, and ready handshake are among the control signals. Output enable—OE and write enable —WE are mapped to the same function pins 9, 36 of the CompactFlash interface. The total number of pins in the SmartMedia interface is 22.

The Memory Stick and MMC/SD flash-memory-card interfaces are smaller still, since parallel data or address busses are not present. Instead, serial data transfers occur through serial data pin DIO, which is mapped to pin 19 (A1). Data is clocked in synchronization to clock SCLK on pin 18. A command signal CMD or BS occupies pin 20 (A0). The MMC/SD and Memory Stick interfaces require only 6 pins plus power and ground.

Detection logic in converter chip 40 reads card-select pins CD0, CD1 to detect the presence of a flash-memory card. When a new card is present, detection logic then reads pins A0, A1 as inputs to determine the card type. The pullup resistors of FIG. 4A together with wiring inside the adapter and the card's behavior determines whether A0, A1 are pulled low by the adapter or pulled high by the pullup resistors.

Figure 6:
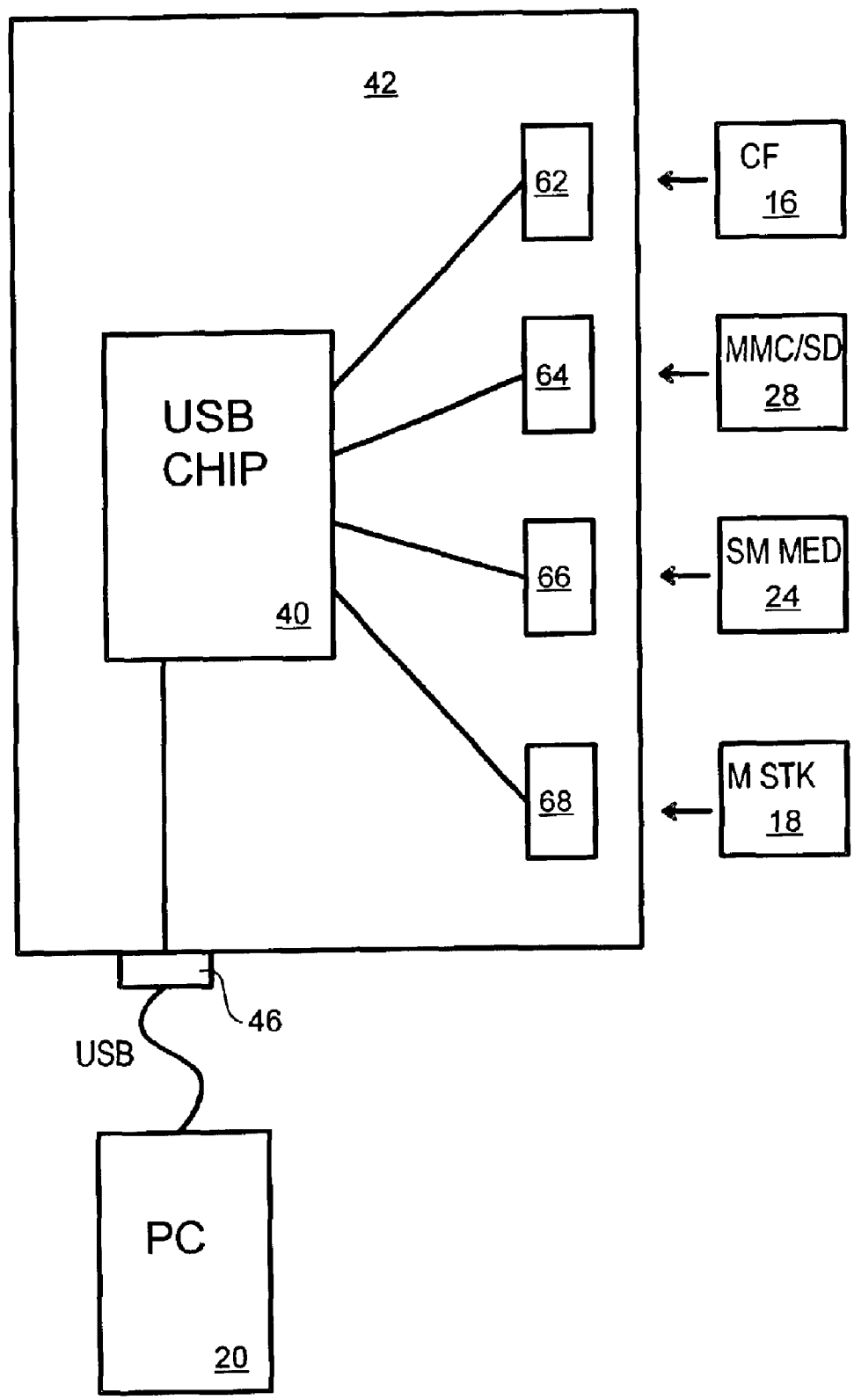
FIG. 6 is a diagram of a multi-slot embodiment of the flash-card reader.

FIG. 6 is a diagram of a multi-slot embodiment of the flash-card reader. While the single-slot embodiment of FIG.

3B results in the smallest physical design, somewhat larger flash-card readers can be made that have separate slots for each type of flash-memory card, rather than a single slot. This negates the need for the adapters.

Four connectors are provided in flash reader 42: a 50-pin CompactFlash connector 62 that fits CompactFlash card 16, a 9 pin MMC/SD connector 64 that fits MultiMediaCard 28 or a Secure Digital card, a 22-pin SmartMedia connector 66 that fits SmartMedia card 24, and a 10-pin Memory Stick connector 68 that fits Memory Stick 18.

Each of the four connectors 62, 64, 66, 68 route their signals to converter chip 40. Converter chip 40 detects when a flash-memory card has been inserted into one of the connectors 62, 64, 66, 68 and configures itself to read files from the inserted card using the pin interface of FIG. 5 corresponding to the card type.

Converter chip 40 executes various routines to perform handshaking with the flash-memory cards and accept data, either serially or in parallel. The data is buffered and then sent to the host PC 20 through USB connector 46. Converter chip 40 generates the appropriate USB-interface signals to transfer the data to host PC 20.

Having separate connectors 62, 64, 66, 68 with separate slots in flash reader 42 allows for card-to-card transfers. For example, images or other files from Memory Stick 18 could be transferred to CompactFlash card 16 by converter chip 40 reading serial data from Memory Stick inserted into connector 68, converting to parallel, and writing to connector 62 and CompactFlash card 16. Each of the flash-memory cards in connectors 62, 64, 66, 68 can be assigned a different drive letter by the operating system, such as e:, f:, g:, and h:.

In this embodiment, flash reader 42 is contained in an external housing that connects to host PC 20 through a USB cable. Of course, other cables and interfaces such as IEEE 1394 FireWire may be substituted.

Field-Operable Stand-Alone Apparatus for Media Recovery and Regeneration

Figure 9:
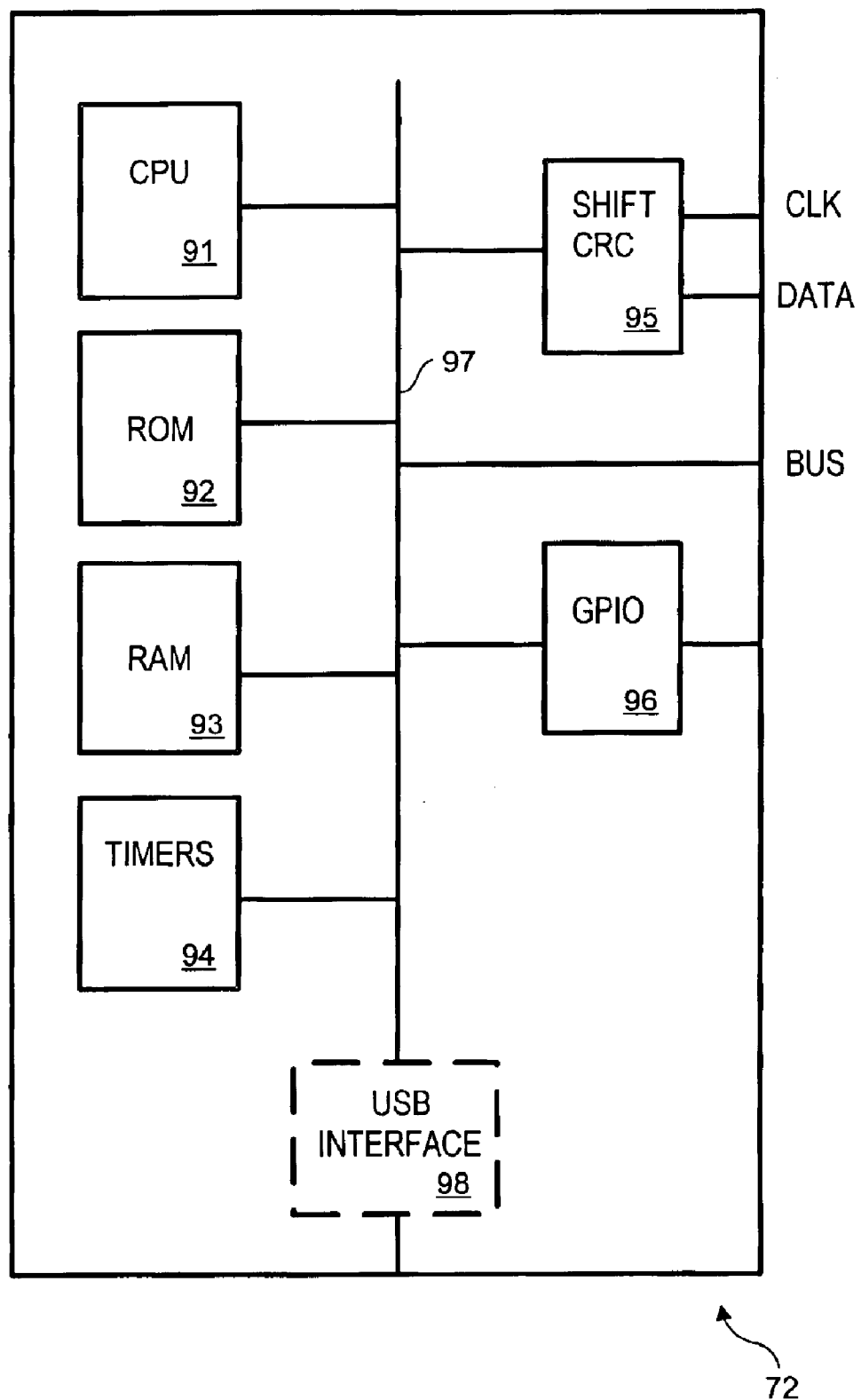
FIG. 9 is a schematic block diagram illustrating the major functional components of an exemplary controller that may be employed in the field operable apparatus of FIGS. 7 and 8.

FIG. 9 is a diagram of a field-operable stand-alone apparatus 70 that accepts several formats of flash-memory cards and can retrieve image data from damaged flash media and regenerate/repair such media so that it may be operable without requiring the use of a host PC. This type of apparatus may be useful in many situations. For example, users of digital cameras may not always have their PC's nearby. While extra flash-memory cards can be purchased and swapped in the digital camera, these flash-memory cards are somewhat expensive, especially when many high-resolution images are captured. Furthermore, in situations such as when users are traveling and are away from their PC, the users may be limited by the capacity of the flash-memory cards.

In one embodiment, field-operable apparatus 70 includes four slots with corresponding connections: A 50-pin CompactFlash connector 62 fits CompactFlash card 16, a 9-pin MMC/SD connector 64 fits MultiMediaCard 28 or a Secure Digital card, a 22-pin SmartMedia connector 66 fits SmartMedia card 24, and a 10-pin Memory Stick connector 68 fits Memory Stick 18. Each connector is operably-coupled to a controller 72, as depicted by bus lines 63, 65, 67, and 69.

Controller 72 detects when a flash-memory card has been inserted into one of the connectors 62, 64, 66, 68 by sensing card select lines CD0, CD1 in the manner discussed above, and automatically configures itself to read files from the inserted card using the pin interface of FIG. 5 corresponding to the card type. Controller chip 72 also executes software depicted as software instance 74, which includes various routines to perform handshaking with the flash-memory cards and accept data, either serially or in parallel. As described below, software instance 74 also includes modules and procedures and the like embodied as executable instructions that enable the apparatus to perform data recovery, regeneration, and repair operations on damaged flash media when executed by controller 72.

In general, field-operable apparatus 70 may include one or more storage means on which data are stored, including a removable mass storage device 76, random access memory (RAM) 78, and flash memory 80. For example, embodiments that include a removable mass storage device may use such a device for storing image data retrieved from a corrupted flash media device. In this instance, data are read from the damaged flash media device, buffered, and then sent to the removable mass storage device to be written in a format compatible with the device, all via control by controller 72 through execution of software instance 74. In general, the removable mass storage device will store the data on a removable media 77, such as a standard or a high-density floppy diskette, a tape, a writeable CD-RNV disk, or other proprietary media such as LS120 by Imation of Oakdale, Minn., or ZIP drive media by Iomega Corp. of Roy, Utah.

In general, RAM 78 may be used for temporarily storing data or executable code during run-time operations. For example, as described below, all or most of software instance 74 will be stored in some form of non-volatile storage on the device, such as read-only memory (ROM). Since RAM is much faster than ROM, the executable code will first be loaded from the ROM into the RAM, where it may be executed by controller 72. In other instance, RAM 78 may be used as a block buffer or large buffer that is used to install blocks of data retrieved from the damaged flash media. As described below, this retrieved data can then be reformatted, and written back to the flash media to regenerate the media.

Flash memory 80 may be used for several purposes. In one embodiment, flash memory 80 may be used as a flash store for storing images, including both images retrieved from corrupted flash media, and images simply read from uncorrupted flash media. For example, a user of apparatus 70 may wish to store several flash media cards worth of digital photos taken during a trip. Rather than bring and keep track of dozens or more flash media cards, the user would only have to bring a single card, and possibly a backup in case the original card was lost or physically damaged. Data could then be transferred to the on-board flash media of apparatus 70 whenever the flash card became full. Another consideration is that flash media cards are generally proprietary, as discussed above. This typically results in flash media cards being significantly more expensive than the underlying flash memory chips used to store the card's data. As a result, a apparatus 70 capable of holding, e.g., a dozen Memory Stick cards worth of data might actually cost less than the dozen Memory Sticks, proving to be of value without evening considering the apparatus' data recovery and regeneration capabilities.

As another option, apparatus 70 may provide a communications interface, such as a USB interface 46 to enable communication with another device, such as a desktop or laptop PC, a PDA, a pocket PC, etc., in a manner similar to that described above. This would further extend the inherent functionality of the apparatus. For instance, if a user employed flash memory 80 to store image data during a trip, the user could transfer such data to his PC when he returned home. As another example, field-operable apparatus 70 could be used for data recovery and regenerations features while in the field, while it could additionally be used as a universal flash media reader while in the home or office. Typically, the communication interface may be controlled via controller 72, via either built-in control logic, firmware execution, or software execution, or a special purpose interface chip, such as a USB interface chip 40' may be employed for such purposes.

In general, field operable apparatus 70 may be powered by one or many well-known power sources. For example, the apparatus may employ conventional replaceable batteries, such as AA— and AAA—size batteries, as depicted by battery symbol 82. The apparatus may also include an external power input 84 via which a DC voltage may be externally supplied, such as through use of an AC/DC converter or through an automobile cigarette lighter. Optionally, external power input 84 may be used to supply external power to recharge one or more rechargeable batteries. When appropriate, additional power conditioning circuitry may be employed to ensure the apparatus electronics are provided with properly-conditioned source voltages (not shown).

In the illustrated embodiment, field-operable apparatus 70 is provided with a simple user interface, including a light-emitting diode LED 86 and button 87, along with an optional LCD display 88 In one embodiment, data recovery/ regeneration operations may be initiated via a sensed activation event. For instance, such an activation event might occur when the user inserts a flash-memory card into one of connectors 62, 64, 66, 68. As another option, such an event might be generated in response to user activation of button 87. In response, the apparatus determines which of connectors 62, 64, 66, 68 has a memory card inserted, and performs one or more file recovery/media regeneration operations via execution of software instance 74.

In one embodiment, LED 88 can be programmed to blink during the copying process, and remain lit when the copying is complete, or vice-versa. This provides a simple visual indication to the user of the copying progress. Errors can be indicated with additional LED indicator lamps, or other blinking arrangements or colors. Optionally, error conditions may be displayed on LCD 88.

In an optional configuration, various information may be annunciated via a speaker 89 driven by an audio chip 90. The could include both aural annunciations, as well as verbal annunciations that have been digitally recorded and stored in the apparatus' non-volatile memory. For example, the apparatus could annunciate "recovery completed," when a recovery operation was completed. Other information, such as number of files recovered, identification that a flash media card is physically damaged (i.e., unable to be repaired), etc., might also be verbally annunciated via speaker 90. These operations could either be facilitated by controller 72 (through built-in functionality or execution of firmware or software) or through one or more dedicated components configured for such purposes (not shown).

In general, LCD 88 in combination with one or more buttons 88 (other buttons not shown) may be used to provide a simple user interface to enable users to select various operations, such as retrieval of files from damage media and repairing damaged media. For example, various options may be displayed on the LCD with corresponding indicia disposed adjacent to respective buttons, wherein activation of a particular button is used to select the listed option adjacent to the button.

Figure 7:
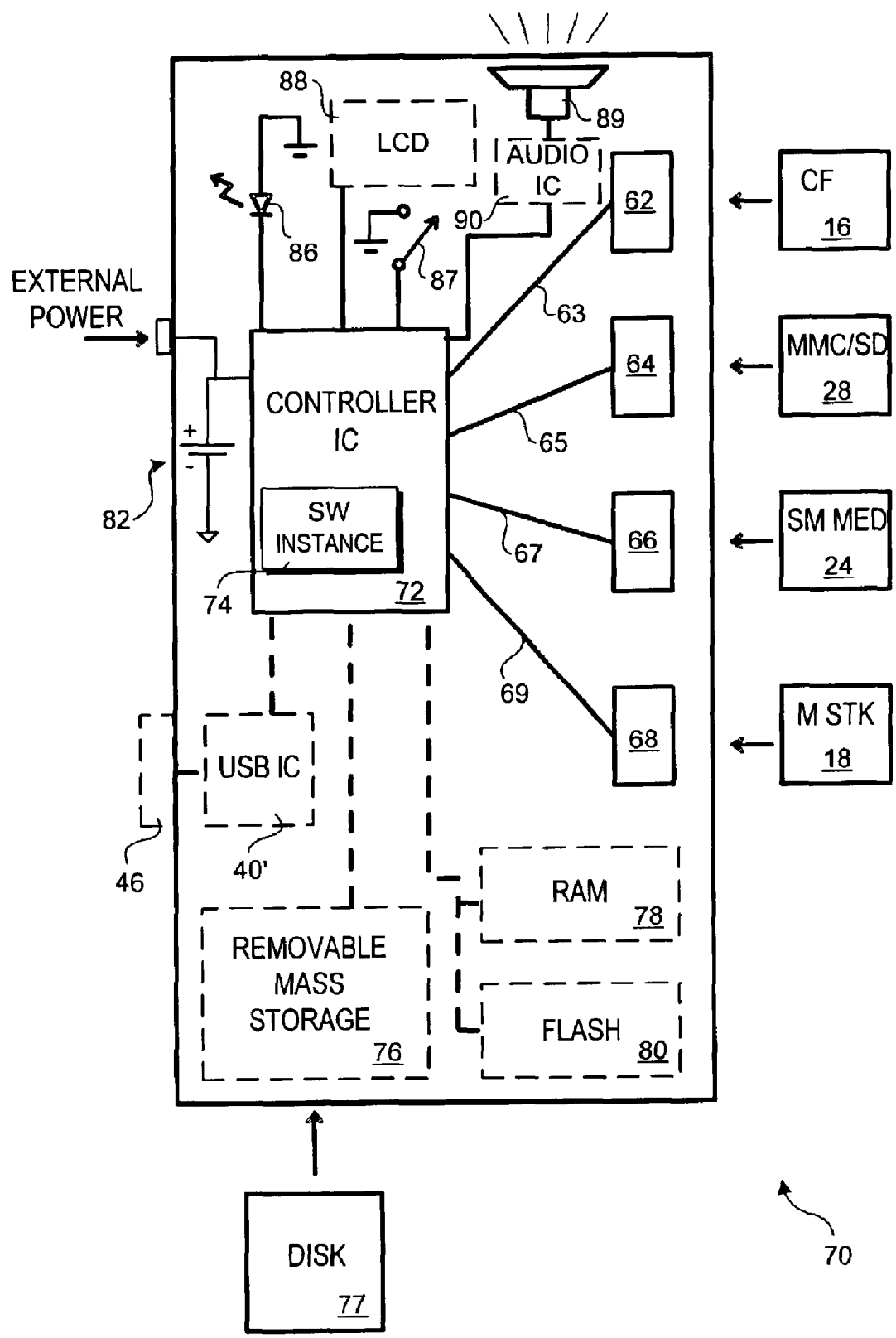
FIG. 7 is a schematic diagram of a field operable stand-alone apparatus in accordance with an embodiment of the invention that may be used to recover data from damaged flash media and/or regenerate such media so that it may be used again by a host device.
Figure 8:
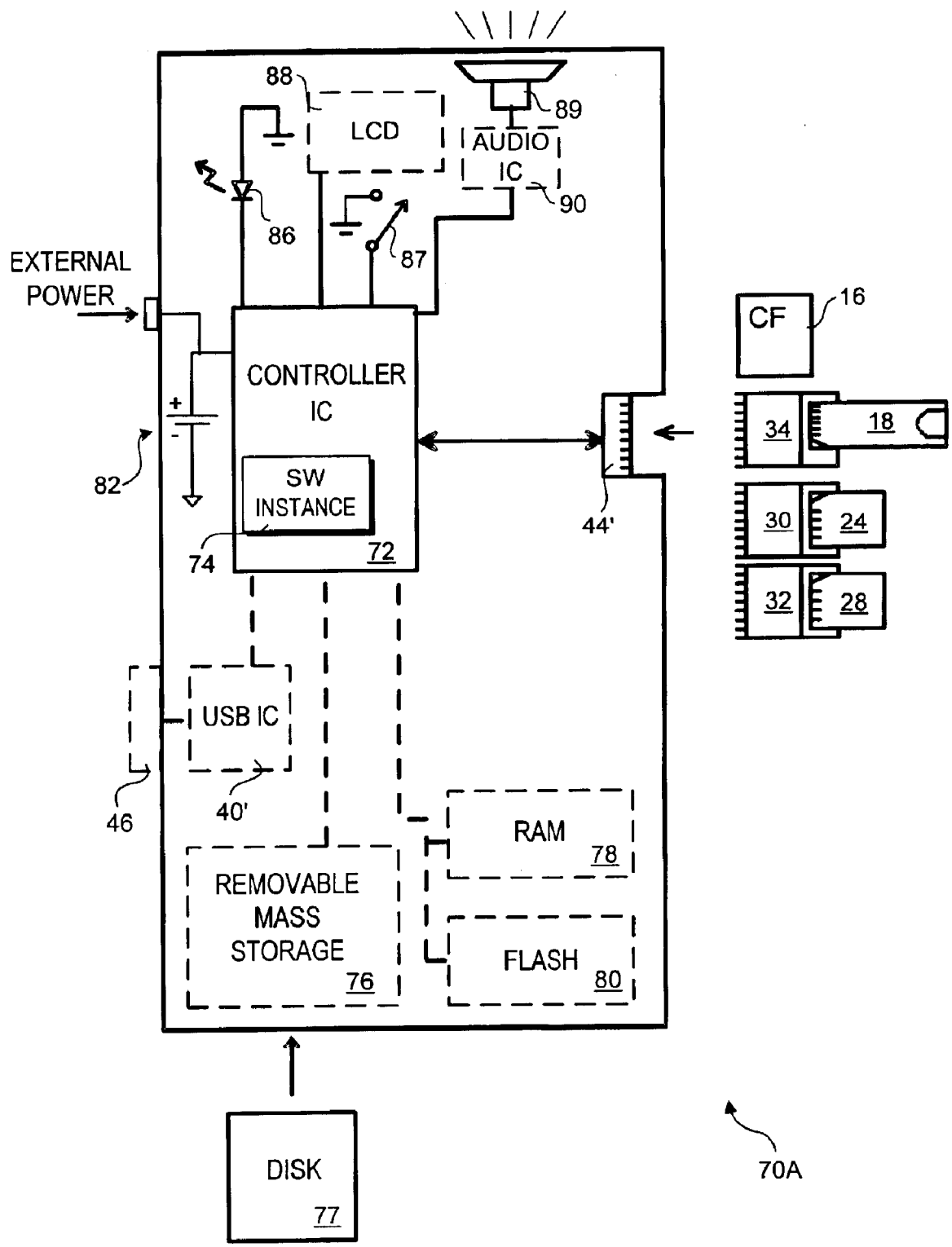
FIG. 8 is a schematic diagram of an optional configuration of the field operable apparatus of FIG. 7.

A field-operable apparatus 70A having an optional configuration in which the aforementioned SM-to-CF adapter 30, MMC/SD-to-CF adaptor 32, and Memory Stick-to-CF adaptor 34 may be employed along with a connector 44' to enable the apparatus to interface with various types of media, including CompactFlash 16, Memory Stick 18, SmartMedia 24, SD media 26, and MMC media 28 is shown in FIG. 8. In general, all of the components having the same reference numbers in FIGS. 7 and 8 perform substantially similar operations. In this instance, controller 72 is programmed to additionally perform the operations of converter chip 40 discussed above with reference to FIG. 3b. Optionally, a separate converter chip may be used for these operations.

FIG. 9 is a diagram showing high-level functional blocks corresponding to an exemplary controller 72. Typically, controller 72 may be implemented as a commercially-available micro-controller chip that is programmed to read and write I/O pins that are connected to the flash-memory-card connectors and optionally USB interface. In the illustrated embodiment, controller 72 includes a CPU 91, ROM 92, On-board RAM 93, timers 94, a shifter 95, and general purpose input/output (GPIO) 96, each of which is connected to an internal bus 97. Optionally, the controller may further include a built-in USB interface 98.

Generally, various control and transfer routines will be written and stored in ROM 92 as executable instructions. At run time, these instructions are loaded from ROM 92 into RAM 93 and executed by CPU 91. Included among these routines is a high-level scanning routine for sensing when a flash-memory card is inserted into one of connectors 62, 64, 66, 68 or 44'. Upon determining the particular type of flash media that is inserted, the instructions will be programmed such that CPU 91 will begin execution of one or more other routine specific to that type of flash-memory card, including transfer and handshake sub-routines.

General-purpose input-output 96 provides registers or I/O ports that drive external I/O pins of controller 72, or read the logic-levels or voltages on input pins to controller (pins not shown). CPU 91 can read registers in GPIO 96 that are written by control signals that are coupled to I/O pins of controller from connectors 62, 64, 66, 68 (or 44' for apparatus 70A). Control signals to the flash-memory cards can be switched high or low by writing a 1 or 0 to a register for that control signal in GPIO 96. GPIO also may be used for general I/O communication with control inputs (e.g., button 88) and for control signals for annunciating LED 86. GPIO can also be used for interfacing with removable mass storage device 76. Optionally, a controller may be employed that has a built-in interface, such as an IDE interface, for providing this functionality.

Timers 94 are useful for asserting control signals for a required amount of time. For example, a control signal may need to be asserted for a specified number of microseconds. CPU 91 can write a 1 to a register in GPIO 96 and start a timer in timers 94. For example, a designated timer can send an interrupt to CPU 91 when the specified time has elapsed, or CPU 91 can continuously or periodically poll timers 94 to determine when the specified time has elapsed. In response, CPU 91 can write a 0 to the register in GPIO 96, causing the control signal to transition from 1 to 0.

Shifter 95 is connected to the data and clock signals from connectors 64, 68. When data is read from the flash-memory card, a clock is pulsed to synchronize the data transfer. Shifter 95 clocks in one bit (serial) or word (parallel) of data for each clock pulse. A cyclical-redundancy-check (CRC) can be performed on the data to detect errors. CPU 91 can request re-transmission of data from the flash-memory card when an error is detected.

Data read by shifter 95 can be sent over internal bus 97 to be stored in a buffer in RAM 92, or optionally RAM 78, depending on the size of RAM 92. Later, CPU 91 can execute a routine to transfer this data from RAM 92 (or 78) to removable mass storage device 76 or flash 80. Subsequently, data stored in flash 80 (or even RAM 92 or 78) may be transferred via USB interface 98 (or USB chip 40') to a computer linked to field-operable apparatus 70 with a USB cable connected to USB port 46.

Software for Performing Data Recovery and Media Regeneration

In accordance with further aspects of the invention, details for implementing software for performing data recovery and flash media regeneration are now disclosed. Typically, executable instructions corresponding to programs, modules, routines, procedures, and the like will be stored in either ROM 92 and/or a separate persistent storage means, such as a separate ROM (not shown), or even flash 80 or other rewritable persistent storage means. For example, if flash 80 was employed, software upgrades could simply be downloaded over the Internet to a PC, and then transferred to apparatuss 70, 70A via, e.g., a USB link. As discussed above, at run time the instructions will generally be transferred to from the persistent storage means to RAM 92 (or 78). In addition to the software discussed below, other executable instructions may include firmware (stored in ROM) for performing basic services, such as disk control/interfacing.

Generally, media cards may be accessed by computers readers or via built-in circuitry designed for reading (usually) a particular type of flash media, as discussed above. Typically, the reader or built-in circuitry, in combination with an appropriate operating system driver, provide an interface to a flash media device such that the device appears to the operating system (and thus application running on the operating system) as a disc storage device, such as a conventional hard disk drive, floppy drive, or CD-ROM drive. Accordingly, the storage structure of flash media devices is configured in a manner that supports a general disk access scheme. In support of this scheme, flash media often employ disk-like file system access schemes.

Figure 10:
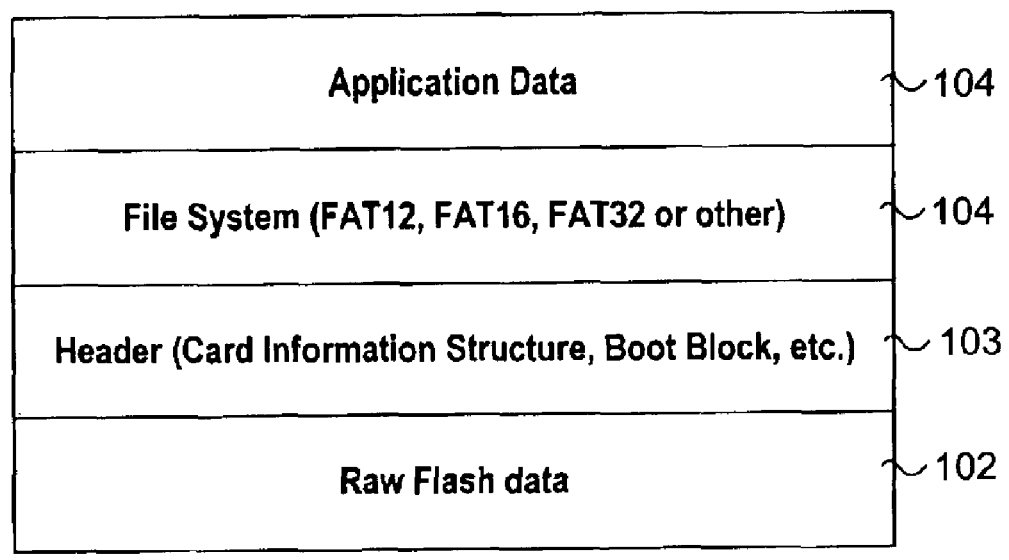
FIG. 10 is a block diagram illustrating a data stack corresponding to a typical flash media data access scheme.

FIG. 10 shows a typical organization of a data stack in a flash card. At the bottom of stack 100 is the actual raw flash data 102. The raw data may contain bad blocks, etc., which are usually dealt with on the file system level (i.e., FAT level) 104. The main file system types are FAT12, FAT16 and FAT32. All of these contain a master boot record (MBR) used in conjunction with a disk boot record (DBR) and file allocation table (FAT) to store computer-type. A flash header 103 generally contains information from which physical (i.e., raw data) to logical (i.e., file system level) mapping can be determined, such a Card Information Structure (CIS) information. Generally, the CIS contains information about the card manufacturer, many of the device characteristics, and is sometimes used to define manufacturer-specific features, such as whether data stored on the media correspond to digital pictures in a regular or panoramic, etc., also referred to as proprietary sub-formatting information for different camera types; and MP3 players, mostly using proprietary information. Similarly, devices that use Memory Stick media put down a header 103 known as a Boot Block to signify that the media has a known signature on it.

The header 103 also lets the system know what type of file system is used in layer 104. The file system (FAT typically) contains information about which sectors form contiguous files, which sectors are bad and cannot be used, etc. In some cases they may also contain information about how often a sector has been used, to optimize rotation, but that type of information is not necessarily required, as the number of cycles performed by cameras is rather low when compared to typical PC applications.

On top of the FAT is the formatted data 105, which is the data that is typically presented to a user. This data is often in a format such as Joint Photographic Expert Group (JPEG or JPG) files, Bitmap Picture (BMP) files by Microsoft, Graphic Interchange File (GIF) files by CompuServe, Motion Picture Expert Group Protocol Layer 3 (MP3) files, Waveform Audio File Format (WAV) files, Audio-Video Interchange (AVI) files, Tagged Image File Format (TIFF or TIF) files, Motion Picture Expert Group (MPG or MPEG) files, QuickTime Movie (MOV) files by Apple using QuickTime format, and Windows Media Audio format (WMA) files.

Figure 11:
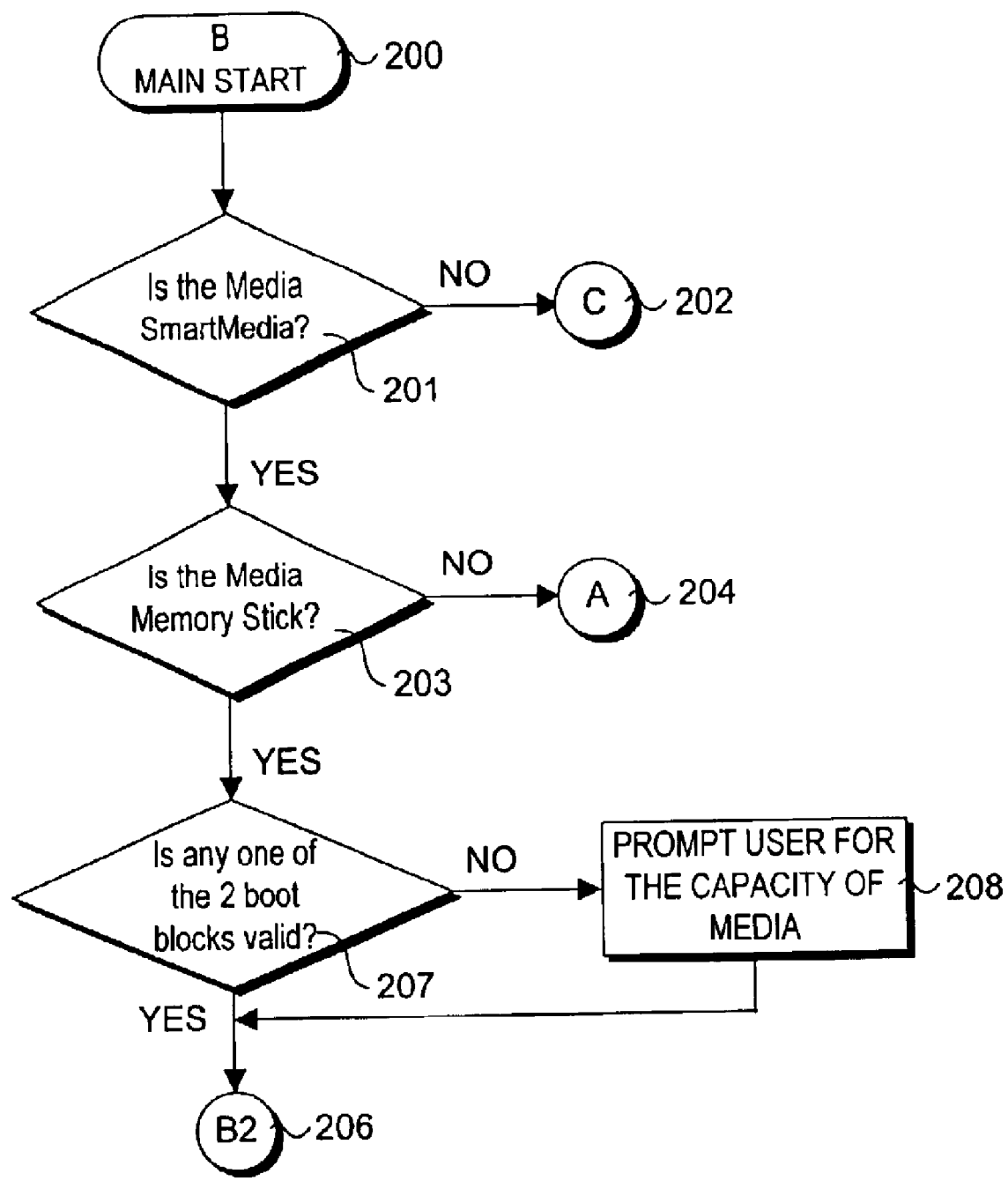
FIG. 11 is a flowchart showing high-level operations corresponding to a software program in accordance with an embodiment of the invention.

FIG. 11 shows a top-level flowchart illustrating operations performed by an embodiment of the novel software program described herein. The program initializes at a block 200, which corresponds to the main entry point in the program. Typically, the initiation process will be invoked in response to a sensed activation event, such as insertion of a flash media card or user activation of button 88. In a decision block 201 wherein a determination is made to whether the flash media comprises SmartMedia. If it does, the logic proceeds to a block 202, which initiates the operations shown in FIG. 12a.

Figure 1A:
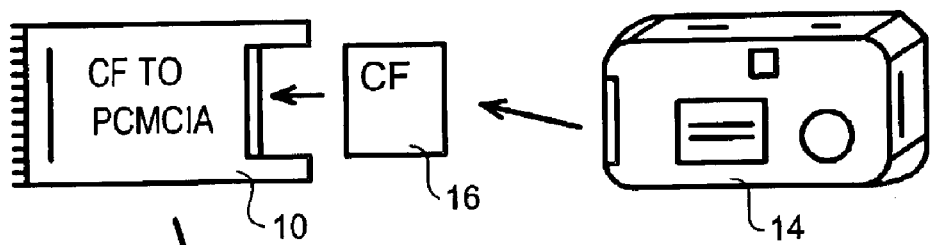
FIG. 1A shows a flash memory card and adapter for transferring images from a digital camera to a PC corresponding to a conventional transfer scheme.
Figure 1B:
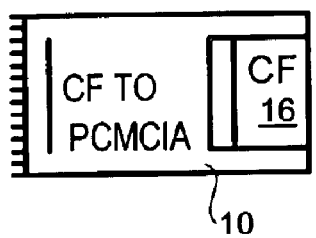
FIG. 1B shows the CF-to-PCMCIA adapter with a CompactFlash card fully inserted.
Figure 1C:
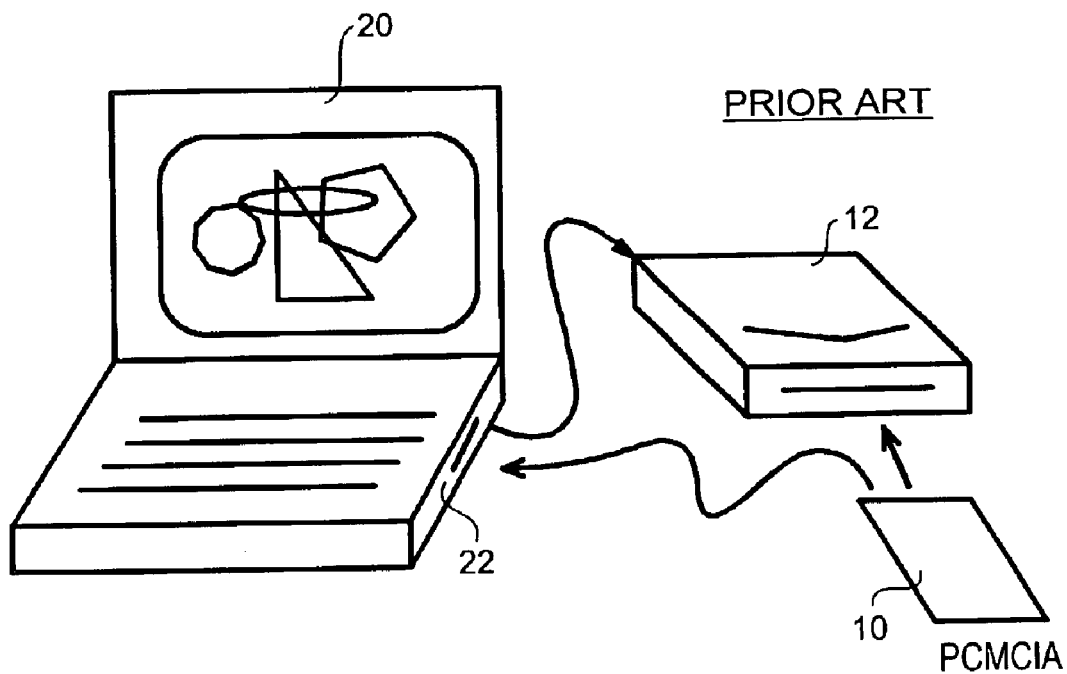
FIG. 1C shows a PC connected to a PCMCIA reader.
Figure 2A:
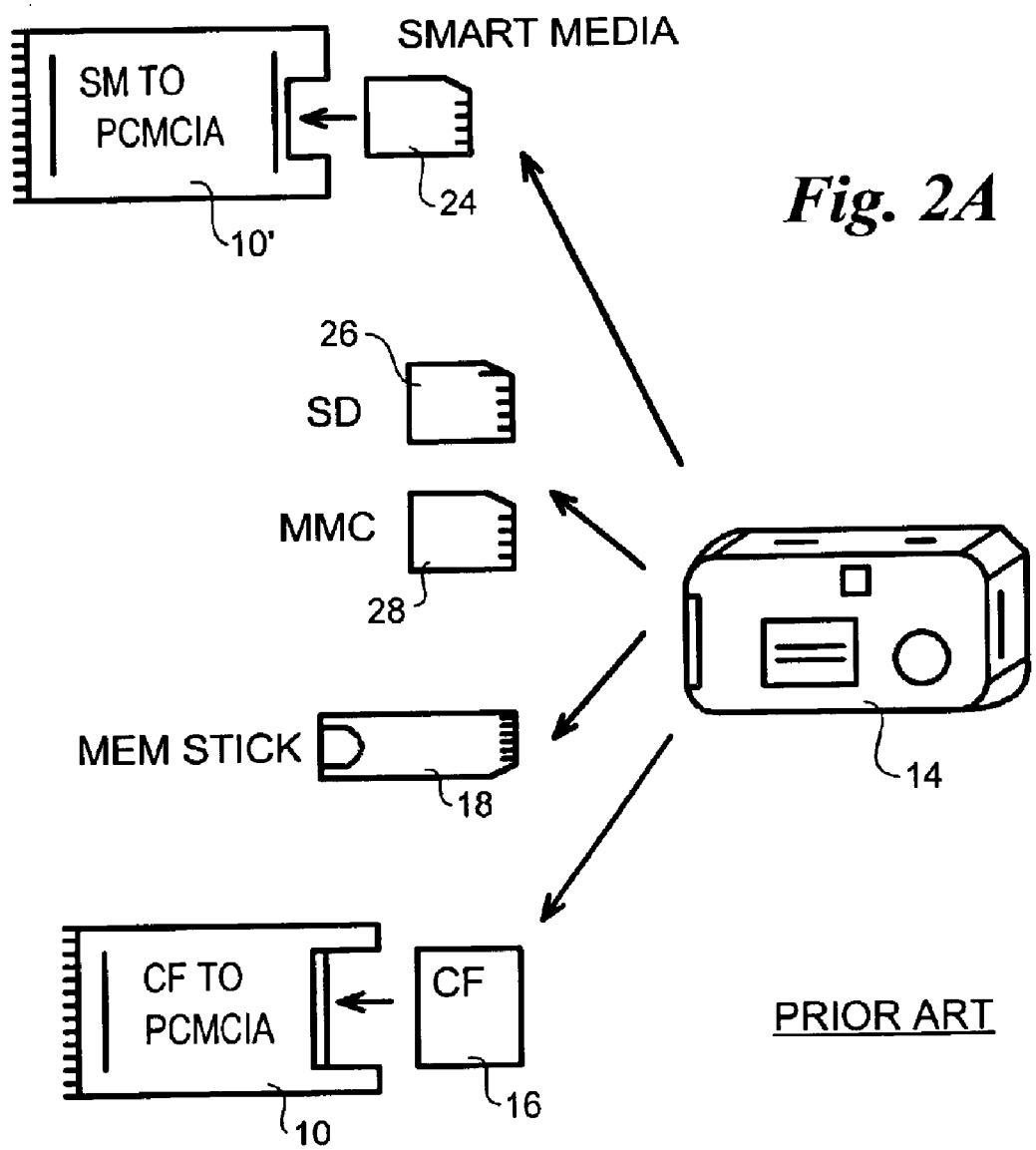
FIG. 2A illustrates various formats of flash-memory cards used with digital cameras.
Figure 2B:
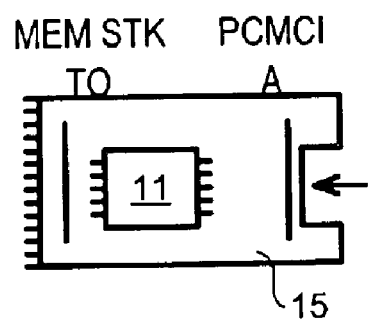
FIG. 2B shows a Memory Stick-to-PCMCIA adapter that employs an active converter chip.
Figure 12A:
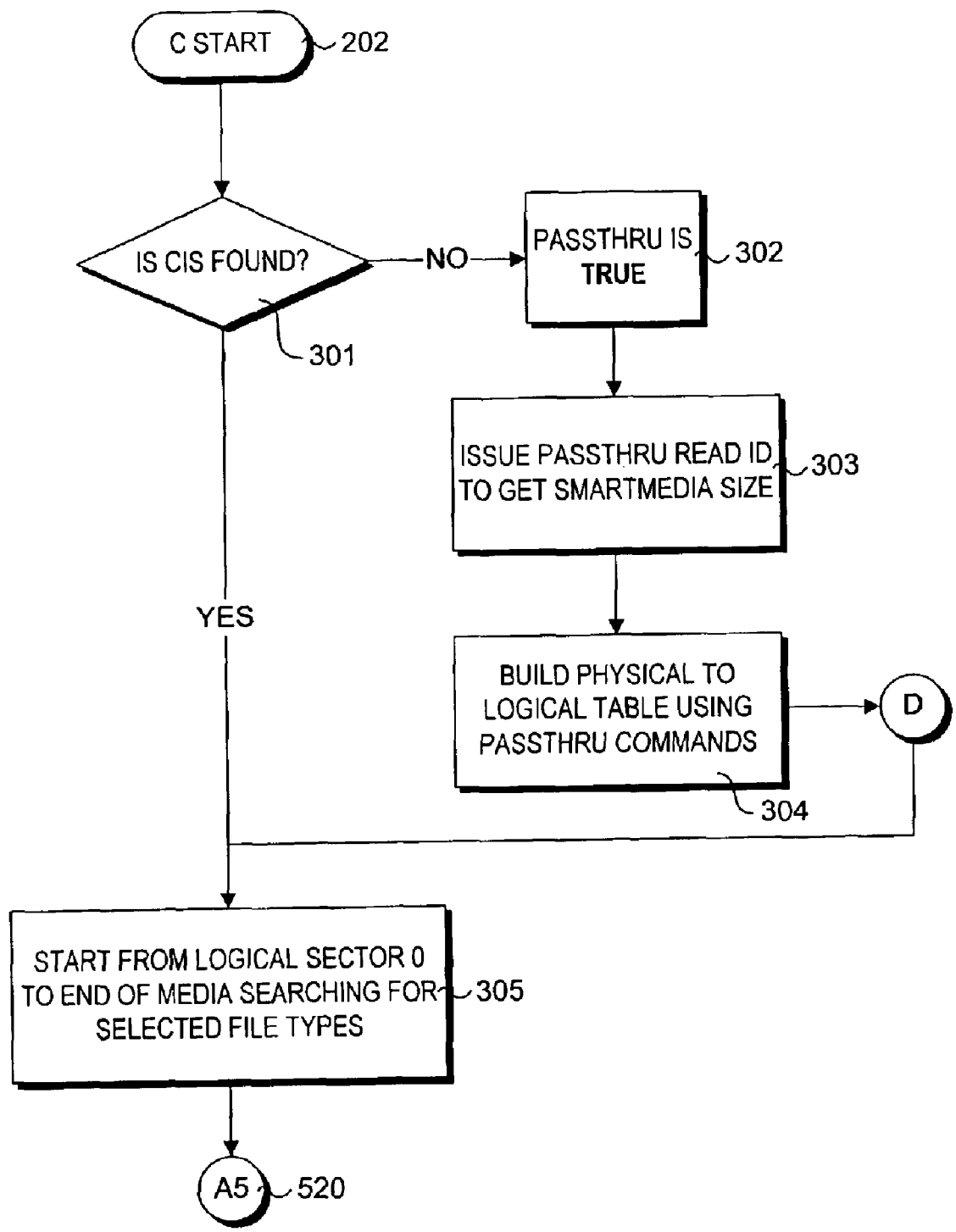
FIG. 12a is a continuation of the flowchart of FIG. 11 illustrating operations and logic pertaining to processing a SmartMedia flash device.

In accordance with a decision block 301 in FIG. 12a, the program looks at the SmartMedia flash header to determine if a CIS exists. Generally, the CIS will be stored in the first available physical block (e.g., physical block 0, if this block is not damaged). As described above, the CIS includes information that is used for defining characteristics of the media, including its physical access structure (i.e., block size, number of blocks, etc.). For SmartMedia cards this (preferably) will correspond to the physical access structure defined in the SmartMedia Physical Format Specification. If no CIS is present, the program builds a Physical-to-Logical table through pass-through code, as described below with reference to FIG. 13. Pass-through code is a code that allows the application to see the layers 101 through 104 (as shown in FIG. 1) below the logical layer 105 that contains the file-formatted data. By looking at the data at the lowest levels, in particular at level 102, the software can determine what was there and rebuild the sectors. Upon not finding a the CIS, a pass-through flag is marked as true in a block 302, and a Pass-through Read ID command is issued to retrieve the SmartMedia size. The Physical-to-Logical table is then built using Pass-through commands in consideration of the SmartMedia size, as described below. Exemplary portions of the pass-through code application program interface (API) are provided in the Appendix section of this disclosure.

Figure 14:
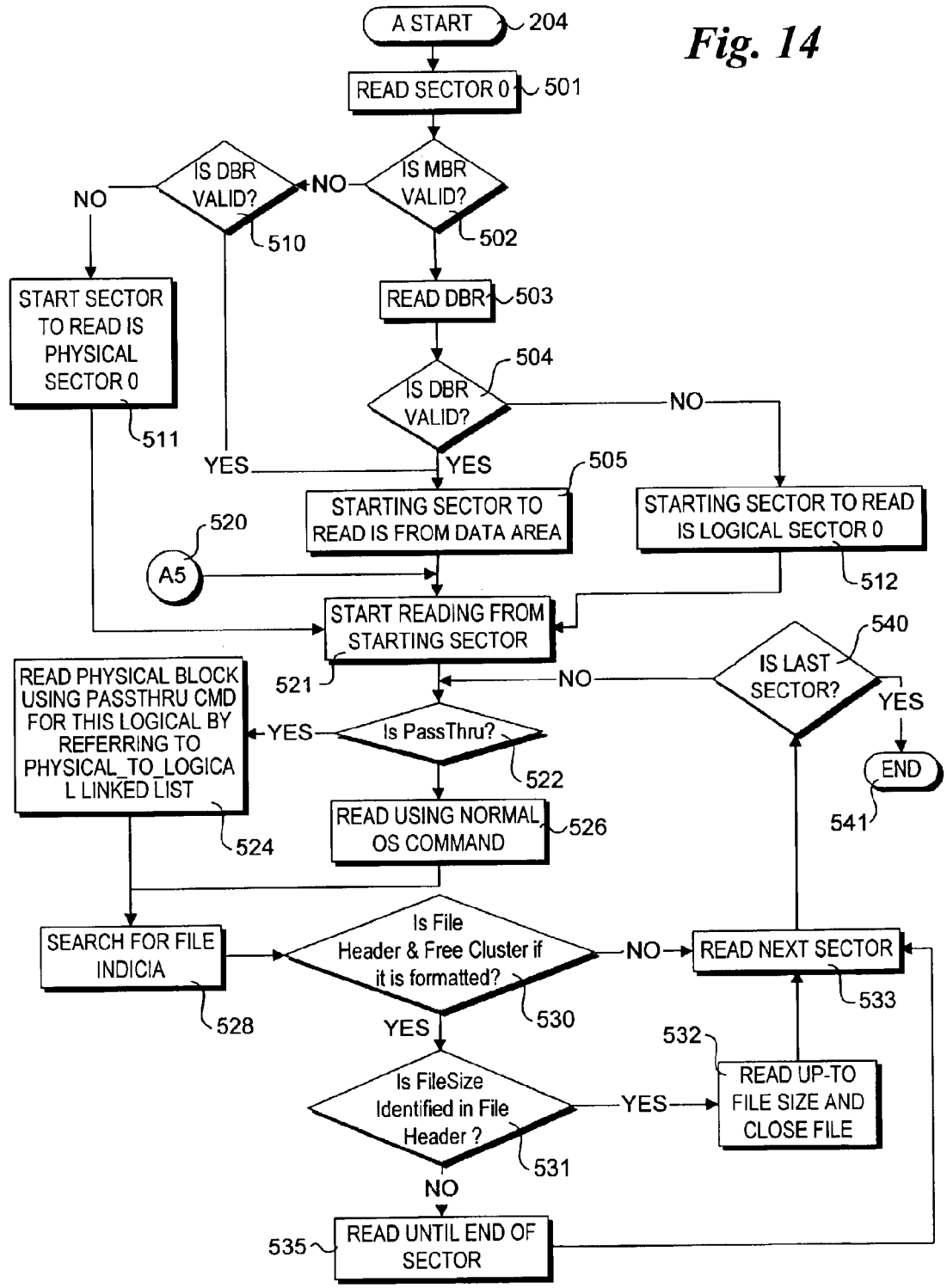
Figure 15:
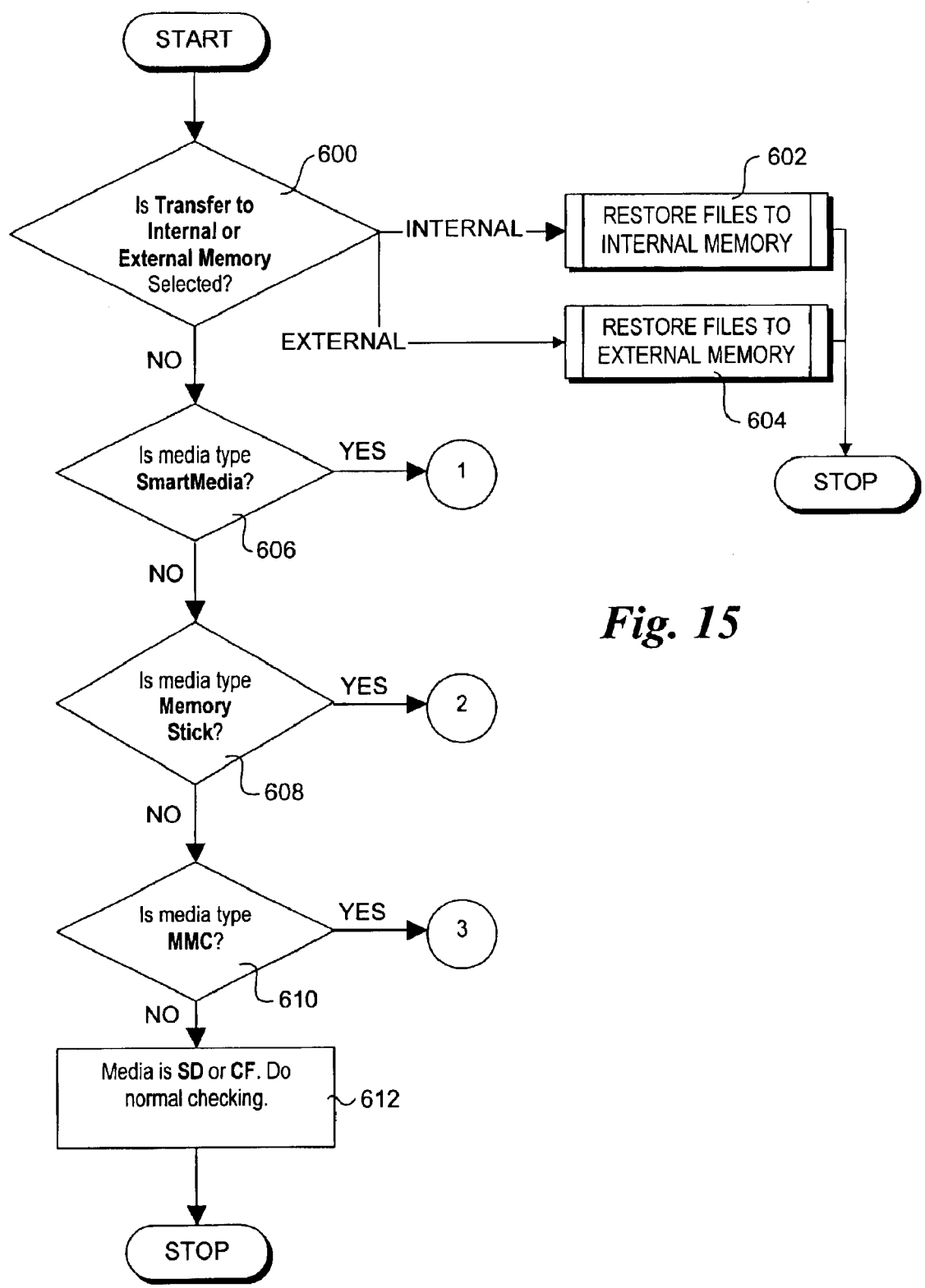
FIGS. 15–20 collectively comprise a flowchart illustrating operations and logic performed during media regeneration in accordance with one embodiment of the invention.

After the CIS is found, or the Physical to Logical table is built, the program proceeds to a block 305, wherein, beginning with logical sector zero, as defined by the Physical-to-Logical table or identified by the CIS, the media is searched for the selected file types described above (e.g., JPEG, GIF, MPEG, etc). In one embodiment, the user may be prompted to indicate the file types present on the medium, or there may be an automatic lookup in a table (not shown) using a database (not shown) to determine which file types are supported. Details of this operation are continued at an entry point 520 in FIG. 14.

Returning to FIG. 11, if the flash media does not comprise SmartMedia, a determination is made in a decision block 203 to whether the media comprises a Sony Memory Stick (or Memory-Stick compatible media). If the answer is No, the program proceeds to a block 204, which begins the operations discussed in the description below of FIG. 14. If the program detects that the flash media is a Memory Stick, the program tests in a decision block 207 to determine whether there is a valid boot block. It is to be noted that Memory Stick media contain two Boot Blocks and if neither one is recognized, the user is prompted in a block 208 to give the capacity of the medium and then the program returns to the main flow, so that in either case (No or Yes), the program proceeds to a block 206, jumping the flowchart description to FIG. 3*b*. In one embodiment, user interaction is enabled via verbal instructions issued via speaker 90. For example, a verbal instruction could be issued such as, "push button once for 2 megabyte media, twice for 4 megabyte media, and three times for 8 megabyte media." In another embodiment, a small LCD screen, along with corresponding user input buttons, may be employed (not shown).

Figure 12B:
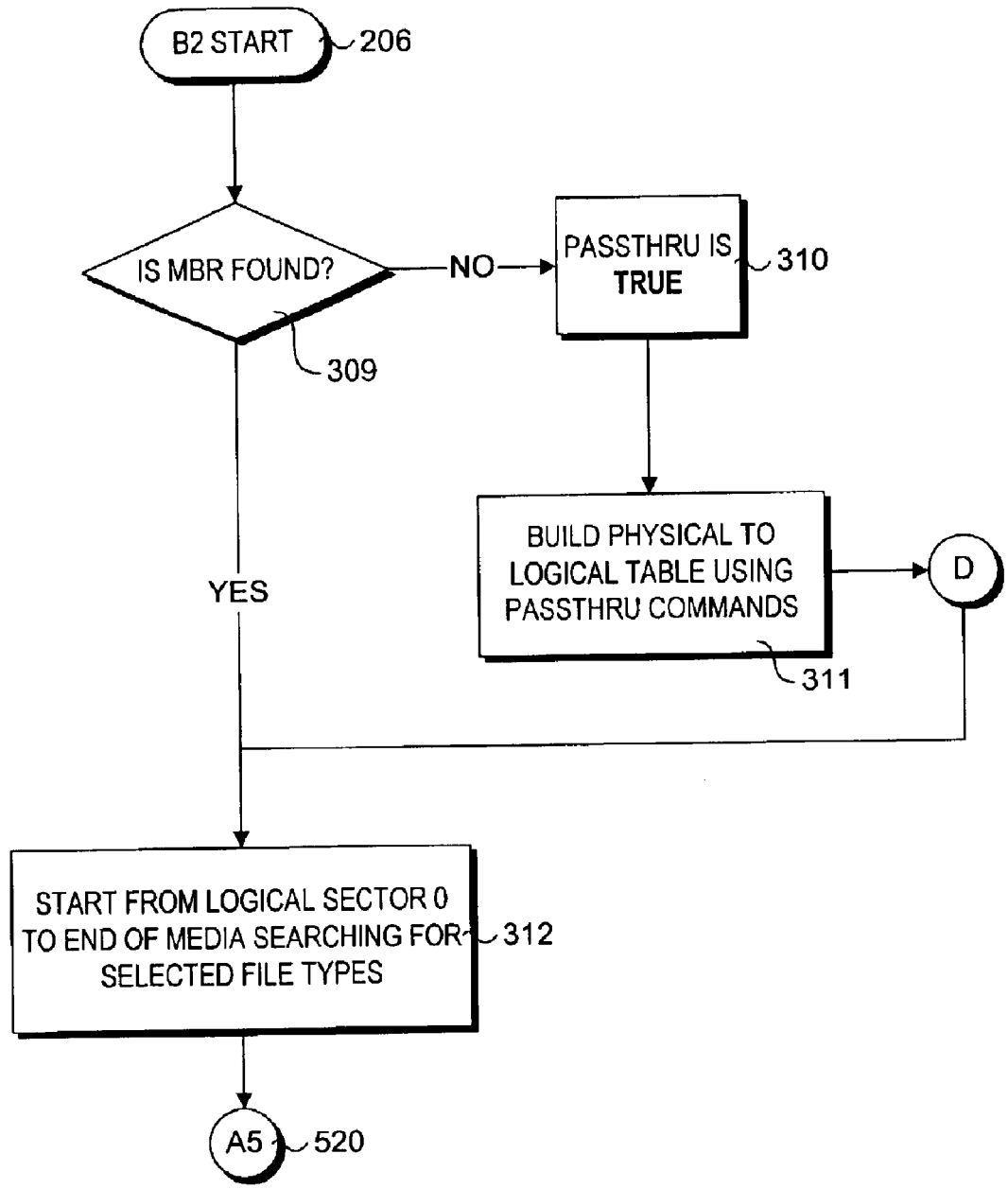
FIG. 12b is a continuation of the flowchart of FIG. 11 illustrating operations and logic pertaining to processing various types of flash media that don't include SmartMedia and Memory Stick devices.

Referring now to FIG. 12*b*, in a decision block 309, the program searches for a master boot record. If an MBR is not found, the pass-through flag is marked at TRUE in a block 310, and a Physical-to-Logical table is built using Memory-Stick pass-through commands in accordance with a block 311 and the operations of FIG. 13 described below. After finding the MBR or building the Physical-to-Logical table, the program proceeds to a block 512, in which the program again starts from Logical Sector 0 (identified via either the MBR or the physical-to-logical table) and searches for the selected file types using a process similar to that performed in block 305 of FIG. 12*a* above. Details of this operation are continued at an entry point 520 in FIG. 14.

Building the Physical-to-Logical Table

In general, a flash media device has a physical storage scheme corresponding to the lowest access level of the device. This is very inconvenient for software application and the like to use, since various flash media have different physical storage schemes. In order to provide a standard access interface, a file system interface (i.e., layer 104) is provided. The file system handles the details of converting file access requests from an application (via an operating system call and using a corresponding OS driver) to a low-level request that is actually used to access the data. This is usually supported by a Physical-to-Logical mapping scheme, whereby the file system presents a logical representation of the storage device to the application. The file system layer also enables the file system to be standardized (e.g., FAT12, FAT16, FAT32, etc.), enabling access to the flash media using a well-known interface.

At it lowest level, flash media provide a physical storage scheme based on addressable units called blocks. A block-addressing scheme (vs. a pure linear addressing scheme) is used, in part, because individual bits on flash media devices are not re-writable. Accordingly, in order to rewrite data, one or more entire blocks must first be erased (i.e., reset), and then new data may be written to the block(s) by setting selected bits. For convenience, the physical addressing scheme may employ a page-based memory access scheme, wherein each block is further divided into one or more memory pages. This enables the device to support a page-by-page reading and (for blocks that have been reset) writing scheme, and a block-by-block erasing scheme. For example, an 8 Megabyte SmartMedia device has 1024 blocks, each comprising 16 pages of memory, wherein each memory page comprises 512 bytes plus 16 "extra" bytes, and wherein individual bytes may be accessed via a page address and an offset address.

As described above, the logical storage scheme for flash media is generally set up to mimic a disk storage device (i.e., hard drive), wherein the most basic storage unit comprises a sector which may map to one or more physical storage pages based on Physical-to-Logical mapping. The 16 extra bytes above are termed "extra" because in a corresponding disk device, each memory page will correspond to a 512 byte sector, and the sectors are contiguous without any extra data in between. In general, various types of schemes may be used to store the Physical-to-Logical mapping data, including redundant schemes. In SmartMedia and Memory Stick devices, logical block addressing information is stored in these "extra" bytes.

Figure 13:
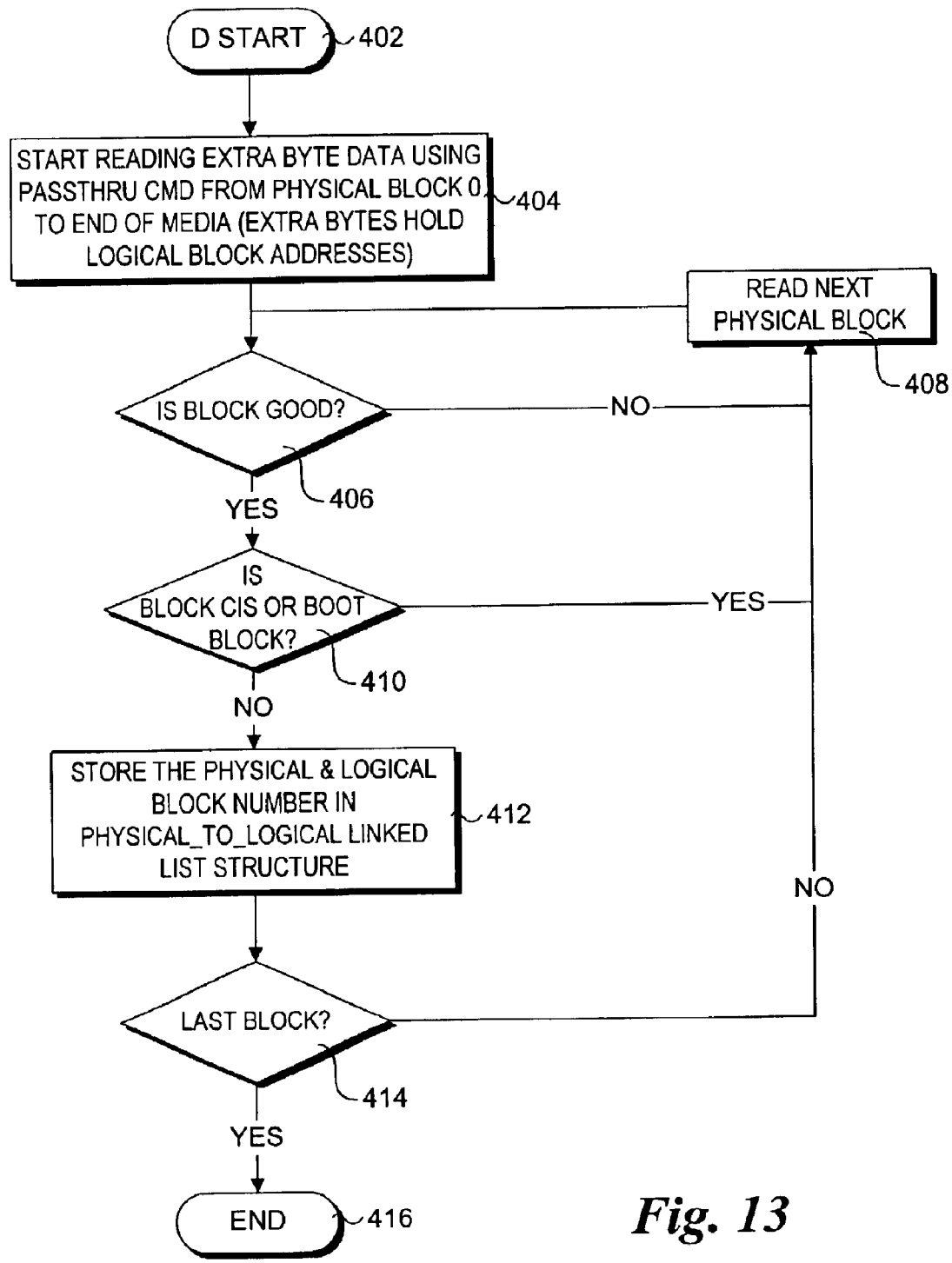
FIG. 13 is a continuation of the flowchart of FIG. 11 illustrating operations and logic performed when building a Physical-to-Logical table that maps physical storage locations to logical storage locations.

In view of the foregoing considerations, details for building the Physical-to-Logical Table are shown in the portion of the flowchart illustrated in FIG. 13. As depicted by a block 404, retrieval of the Physical-to-Logical mapping information begins by reading corresponding data in the extra byte portions of the blocks using appropriate Pass-through commands, beginning with physical block 0 and continuing to the end of the media. For each block, the following operations corresponding to blocks 406, 408, 410, 412, and 414 are performed, as appropriate.

First, in decision block 406, a determination is made to whether the block is good. Such information can generally be obtained directly from the device using known methods. If the block is not good, the logic proceeds to a block 408, which loops the logic back to begin processing the next block. If the block is good, the logic proceeds to a decision block 410 in which a determination is made to whether the block is a CIS block (e.g., for SmartMedia) or boot block (e.g., for Memory Stick). If the answer is Yes, the logic loops back via block 408 to beginning processing the next block. If the block is not a CIS or boot block, data identifying the Logical block number is extracted from the extra byte data for the block and corresponding Physical-to-Logical block mapping information is stored in a PHYSICAL_TO_LOGICAL linked list structure, wherein each entry maps a Physical block to its corresponding Logical block. In accordance with decision block 414 and block 408, the operations of blocks 406, 410, 412, are repeated until all of the blocks have been processed in a similar manner to complete building of the PHYSICAL_TO_LOGICAL linked list structure. This linked list structure comprises the Physical-to-Logical table.

Extracting File Data

Generally, the operations described with reference to the portion of the flowchart shown in FIG. 5 pertain to the extraction of file data from a corrupted flash media device, which may be accessed via block 204 from FIG. 11 or block 520 from FIGS. 12*a* and 12*b*. As discussed above, block 204 is encountered if the flash media is neither a SmartMedia card or a Memory Stick. If such is the case, the first operation that is performed is to read Sector 0, in accordance with a block 501. Next, in a decision block 502 a determination is made to whether the MBR is valid. If the MBR is valid, the disc boot record (DBR) is read in a block 503 and tested for validity in a block 504. If the DBR is valid, the starting sector is determined in block 505 to be from the Data Area. If the DBR is not valid, the starting sector to read is determined to be Logical Sector Zero, as depicted by a block 512.

In case no valid MBR is detected in block 502, the program branches to a block 510 to see if there is a valid DBR. If there is a valid DBR, it branches back to block 505. If there is no valid DBR, the program proceeds to a block 511, where the starting sector to read is determined to be Physical Sector 0, and from block 511, the program then branches back to block 521.

With continued reference to block 521, this is the point at which the operations of FIG. 5 are joined from blocks 520 in FIGS. 12*a* and 12*b*, i.e., wherein the starting sector is Logical Sector 0. Now all program processes are united at block 521, where the program starts reading from the starting sector, whichever sector has been determined (Physical Sector 0, Logical Sector 0, or Data Area). The following operations are then performed to extract (i.e., read) data pertaining to previously inaccessible files, such as picture files. For example, due to corrupted flash media, such files may not be accessible due to FAT errors, file header errors, checksum errors, etc.

In accordance with a decision block 522, if the PassThru flag is set (TRUE), the physical blocks are read using Pass-through commands in a block 524 by employing the PHYSICAL_TO_LOGICAL linked list created above. If the PassThru flag is FALSE, the reading of logical blocks is performed using normal operating system commands, as depicted by a block 526.

As discussed above, the flash media is read searching for files corresponding to selected file types, which will typically comprise one or more picture format files, such as JPEG, GIF, MPEG, BMP, etc. More specifically, in a block 528 a search is made of indicia via which one or more selected file types can be identified, which will typically comprise a file header, but may comprise other types of indicia. Generally, the file-type indicia may be identified by searching for a specific string or pattern. The following operations illustrate the use of a file header for the file indicia. Those skilled in the art will recognize that similar operations may be performed to extract file data through use of other file indicia as well.

Generally, the reading is performed in sequential bases, using either a sequence of physical block reads (mapped to corresponding logical sectors), or direct reading of a sequence of logical sectors via the operating system. In response to encountering file indicia, a determination is made in a decision block 530 to whether the indicia corresponds to a file header, and whether a corresponding free cluster is formatted. If both are true, the logic proceeds to a decision block 531, wherein a determination is made to whether information identifying the file size (of the file) is included in the file header. If the file size is included in the header, the program continues to read data in accordance with a block 532 until data corresponding to the complete file has been read (as defined by the file size), whereupon the file is closed and the logic proceeds to a block 533 to read the next sector. (It is noted that a given file may span more than one sector.) In a corresponding decision block 540, a determination is made to whether the previous sector is the last sector to be processed. If it is, the process ends in accordance with an end block 541. If not, the program cycles back to block 530 to begin processing the next sector.

Returning to decision block 531, if the program finds a header but does not find the file size, it proceeds to a block 535, where it reads until the end of the current sector, and then returns to block 533. This process is repeated until the last sector is reached as determined by decision block 540, whereupon the program exits in accordance with end block 541.

Those skilled in the art will recognize that the foregoing process is merely exemplary, and that the recover scheme may be modified in many ways. In some cases, for example, the high-level operations of the main program (FIG. 11) may have many more branches, for different media types, or for proprietary file systems, etc., as are disclosed above.

In another embodiment the file allocation table (FAT) on the media is examined to determine its validity, and if it is valid, an attempt to retrieve the file system starting sector, size, etc., is performed. This method is useful if the image data is stored in non-contiguous clusters. A cluster is a minimum allocation unit that the operating system assigns to store data, and typically comprises one or more sectors. For instance, if a cluster is equal to four sectors and each sector is 512 bytes, then even a file of size 1 byte will take up 2048 bytes of space on the medium.

Regenerating Data on Corrupted Flash Media

Details of operations and logic performed when regenerating corrupted flash media in accordance with one embodiment are shown in the flowchart collectively shown in FIGS. 15–20. With reference to the high level portion of the flowchart shown in FIG. 15, the process begins with a decision block 600 in which a determination is made to whether the user has selected to transfer data from the corrupted flash media to internal memory or to external memory. In either instance, the data will be read from the flash media in the manner discussed above. In the case of a transfer to internal memory, the data are read and written to a persistent storage means onboard the field-operable apparatus, such as flash memory 80, as depicted by a predefined process block 602. In the case of a transfer to external memory, the use may place a flash media card in one of connectors 62, 64, 66, 68, or 44' (as appropriate), and the data are written to the flash media card, as depicted by a predefined process block 604. Upon writing to the internal or external memory, the process is complete.

If the answer to decision block 600 is no, the logic proceeds to a decision block 606 in which a determination is made to whether the media type is SmartMedia. If so, the logic jumps to the start of the flowchart portion shown in FIG. 16 at flowchart connector 1. If not, a determination is next made in a decision block 608 to whether the media type is a Memory Stick. If it is, the logic jumps to the portion of the flowchart shown in FIG. 17 at flowchart connector 2. If the media type isn't Memory Stick, the logic flows to a decision block 610 in which a determination is made to whether the media type is MMC. If it is, the logic jumpts to the portion of the flowchart shown in FIG. 18 at flowchart connector 3. If it is not, the media is either SD or CF. In this instance, normal media checking is performed in a block 612, completing the process. Generally, normal media checking comprises operations to verify whether the media is properly formatted, such as checking to see if both FAT1 and FAT2 are good, checking to see if there are multiple physical blocks mapped to identical logical blocks, etc.

Figure 16:
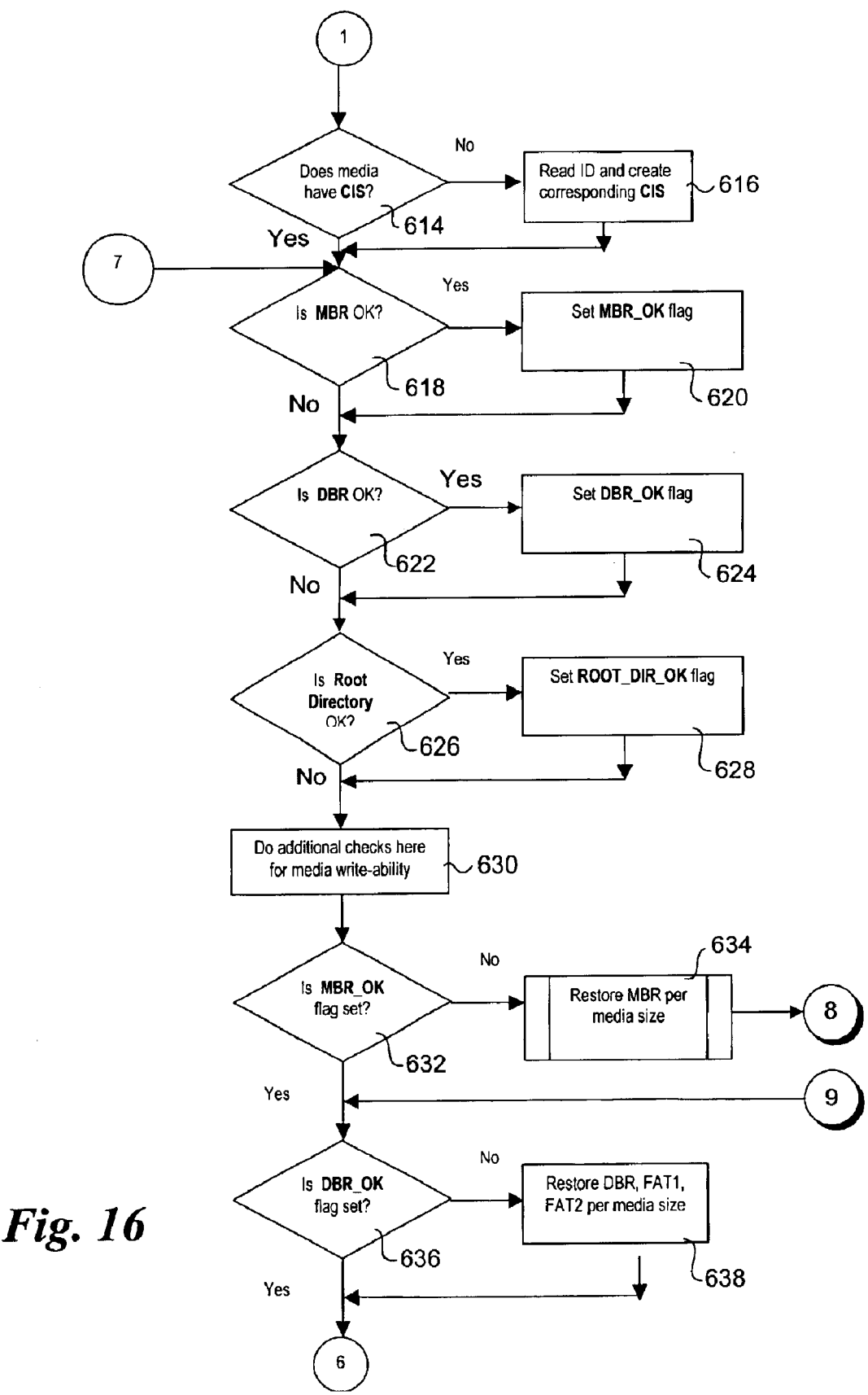

With reference to flowchart connector 1 at the top of FIG. 16, the first operation for SmartMedia media comprises a determination of whether the media has a Card Information Structure (CIS) in a block 614. If the answer is no, the logic proceeds to a block 616 in which the ID for the card is read and a corresponding CIS is created.

Whether the CIS exists or is created, the logic flows to a decision block 618 in which a determination is made to whether the master boot record (MBR) is OK. If it is, an MBR_OK flag is set in a block 620. A determination is then made in a decision block 622 to whether the disk boot record (DBR) is OK. If it is, a DBR_OK flag is set in a block 624.

Next, in a decision block 626 a determination is made to whether the root directory is OK. If it is, a ROOT_DIR_OK flag is set in a block 628. Additonal checks for media write-ability are then performed in a block 630. Following this, a determination is made in a decision block 632 to whether the MBR_OK flag is set. If not, the MBR is restored per the media size using a predefined process 634, further details of which are discussed below with reference to the flowchart portion shown in FIG. 20 at flowchart connector 8. In a decision block 636 a determination is made to whether the DBR_OK flag is set. If not, the DBR, FAT1, and FAT2 file allocation table instances are restored using a predefined process 638 in accordance with the Table 1 parameters. The logic then jumps to the flowchart portion shown in FIG. 19 a flowchart connector 6.

Continuing at flowchart connector 6, in a decision block 640, a determination is made to whether the ROOT_DIR_OK flag is set. If not, the ROOT DIR area is restored and updated as new files are recovered from the media, as depicted by a block 642. General file recovery operations are then performed in a block 644 in the manner discussed above. Upon recovering the files, the ROOT DIR area and the FAT1 and FAT2 areas of the media are updated accordingly. This completes the regeneration process for the SmartMedia.

Figure 17:
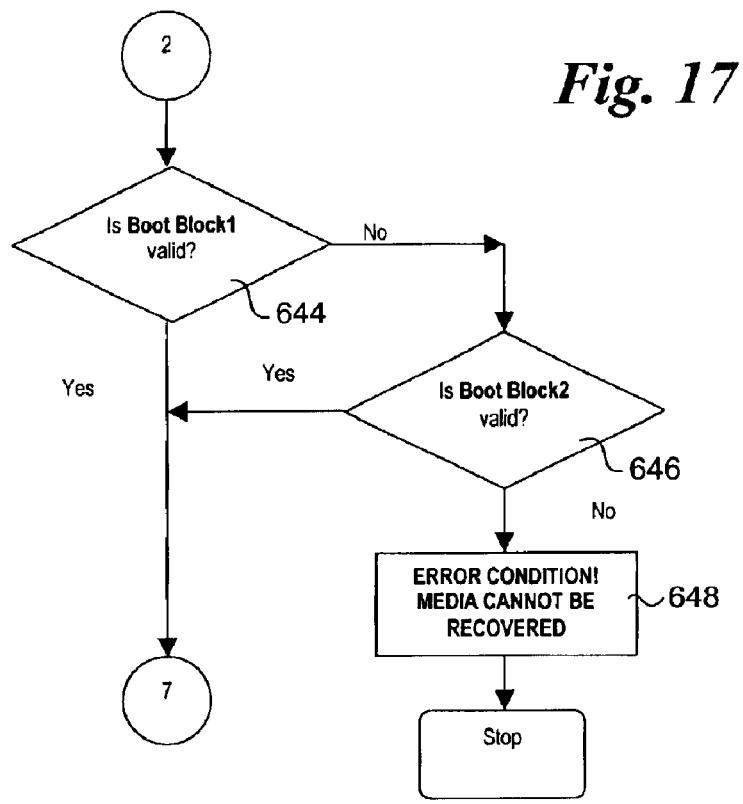

If the media type is a Memory Stick, the logic will jump to flowchart connector 2 on FIG. 17. In a decision block 644, a determination is made to whether Boot Block 1 is valid. If it is not, the logic flows to a decision block 646 wherein a determination is made to whether Boot Block 2 is valid. If neither Boot Block is valid, an error condition exists and the media cannot be recovered, as indicated by a block 648. If either Boot Block1 or Boot Bock2 is valid, the logic proceeds to the portion of the flowchart shown in FIG. 16 at flowchart connector 7. In this instance, the same operations and logic in blocks 618–644 will be performed in the manner discussed above.

Figure 18:
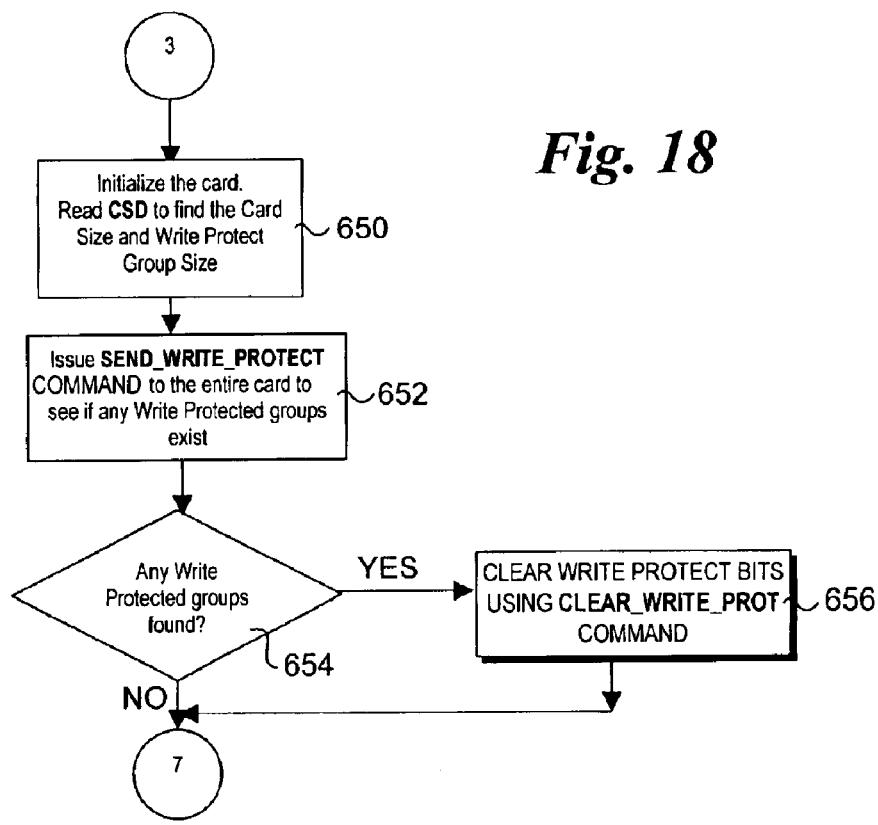
Figure 19:
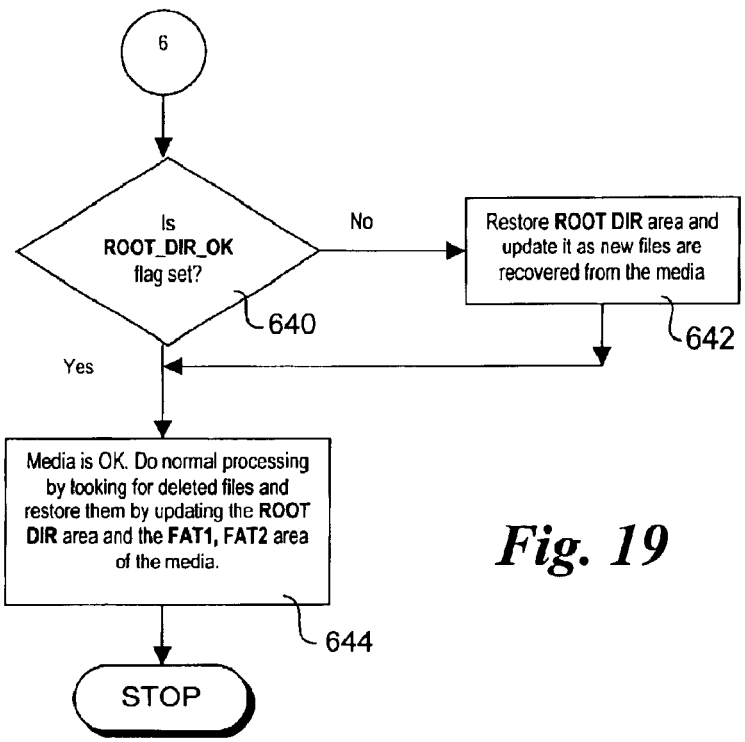
Figure 20:
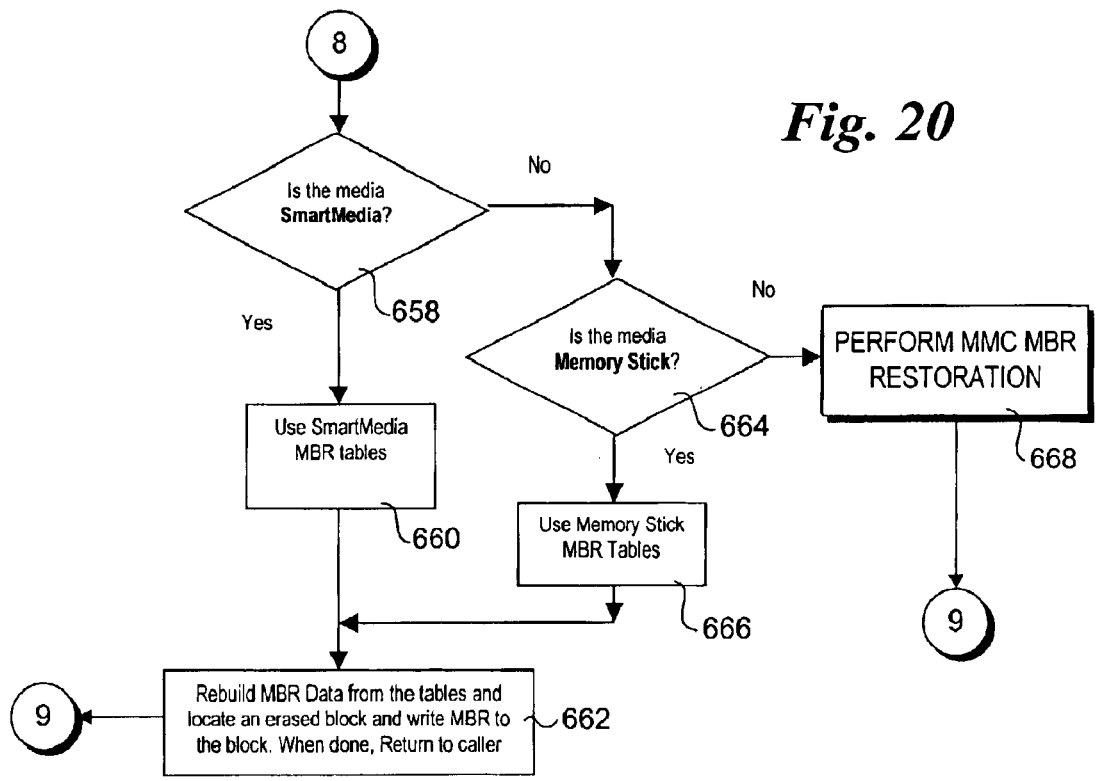

With reference to FIG. 18, if the media type is MCC the first operation is to initialize the card in a block 650. This involves reading the CSD to find the card size and write protecting the group size. Next, in a block 652, a Send_Write_Protect command is sent to the entire card to see if any write protected groups exist. In accordance with a decision block 654, if any write protected groups are found, the write protect bits for those groups are cleared using the Clear_Write_Port command in a block 656. Once these operations are completed, the logic jumps to FIG. 16 at flowchart connector 7, and the operation of blocks 618–644 are again performed in view of the media type being MMC.

Returning to FIG. 20, the restoration of the MBR operations begin in a decision block 658 in which a determination is made to whether the media type is SmartMedia. If it is, the operations of blocks 660 and 662 are performed, wherein the MBR is rebuilt using data from Table 1 of FIG. 21 and locating an erased block and writing the MBR to that block. If the media type is not SmartMedia, a determination is made in a decision block 664 to whether it is Memory Stick. If it is, the MBR is restored in accordance with blocks 666 and 662 using the parameters shown in Table 2 of FIG. 22. If the answer to both of decision blocks 658 and 664 are no, the media type is MMC, and the MBR is restored in a block 668 using MMC-specific parameters (not shown).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A field-operable apparatus, comprising:
   a housing in which apparatus electronics are housed including,
   a controller;
   at least one flash media connector operatively coupled to the controller, configured to accept at least one type of flash media either directly or via a flash media connector adaptor to enable communication with said at least one type of flash media;
   storage means, operatively coupled to the controller; and
   memory operatively coupled to or built into the controller in which instructions are stored, which when executed by the controller perform the operations of:
      detecting an activation event, and in response thereto,
      recovering data corresponding to at least one application file from a corrupted flash media device coupled to the flash media connector by,
         accessing the flash media at a low level to access raw flash data stored on the flash media device;
         searching the raw flash data for file indicia corresponding at least one predetermined file type; and
         reading data from the raw flash data based on information in the file indicia, said data comprising a recovered file; and
      storing the recovered data on the storage means.

2. The apparatus of claim 1, wherein the flash media comprises one of a CompactFlash device, SmartMedia card, MultiMediaCard, Secure Digital card and Sony Memory Stick-compatible device or any flash media device having a similar form factor thereto.

3. The apparatus of claim 1, wherein the storage means comprises a removable, mass storage device that can store data on a removable media.

4. The apparatus of claim 1, wherein the storage means comprises persistent memory.

5. The apparatus of claim 1 wherein the flash media is accessed and searched by performing the operations of:
   building a physical-to-logical table mapping physical storage locations to logical storage locations; and
   sequentially searching through logical sectors in search of the file indicia based an the physical-to-logical table.

6. The apparatus of claim 1, wherein the file indicia comprises a file header, and in response to finding a file header execution of the instructions further performs the operations of:
   extracting a file size from the file header corresponding to a file;
   reading data beginning with the file header or a starting point identified by the file header up to the file size.

7. The apparatus of claim 1, wherein execution of the instructions further performs the, operations of:
   determining a starting location from which to search the flash media; and
   sequentially searching through the flash media for file indicia using one of a physical or logical storage sequence.

8. The apparatus of claim 1, wherein said at least one flash media connector comprises a plurality of flash media connector having respective configurations for receiving different respective types of flash media.

9. The apparatus of claim 1, further comprising a user-input control via which a user can generate the activation event.

10. The apparatus of claim 1, further comprising an annunciation means coupled to the controller, wherein execution of the instructions further performs the operation of activating the annunciation means in response to completing a recovery operation.

11. A field-operable apparatus, comprising:
a housing in which apparatus electronics are housed including,
a controller;
at least one flash media connector operatively coupled to the controller, configured to accept at least one type of flash media either directly or via a flash media connector adaptor to enable communication with said at least one type of flash media;
storage means, operatively coupled to the controller; and
memory operatively coupled to or built into the controller in which instructions are stored, which when executed by the controller perform the operations of:
detecting an activation event, and in response thereto, recovering data corresponding to at least one application file from a corrupted flash media device coupled to the flash media connector by,
determining a media type of the flash media;
building a physical-to-logical table mapping physical storage locations to physical storage locations based on the type of flash media;
searching the flash media for a file header corresponding to at least one predetermined file type using the physical-to-logical table; and
reading data from the raw flash data based on information in the file header; and
storing the recovered data on the storage means.

12. The apparatus of claim 1, wherein execution of the instructions further performs the operations of:
determining any portion(s) of the media that is/are corrupted;
generating rebuild data by which the corrupted portion(s) of the media may be regenerated; and
rewriting the corrupted portion(s) of the flash media with the rebuild data.

13. The apparatus of claim 1, further comprising a display means operatively coupled to the controller by which information can be displayed to a user.

14. A field-operable apparatus, comprising:
a housing in which apparatus electronics are housed including,
a controller;
at least one flash media connector operatively coupled to the controller, configured to accept at least one type of flash media either directly or via a flash media connector adaptor to enable communication with said at least one type of flash media; and
memory operatively coupled to or built into the controller, in which data corresponding a lookup table containing file system parameters particular to different types of flash media are stored, and in which instructions are stored, which when executed by the controller regenerates corrupted flash media by performing the operations of:
reading data from a corrupted flash media device coupled to one of said at least one flash media connector;
determining any portion(s) of the media that is/are corrupted;
generating rebuild data by which the corrupted portion(s) of the media may be regenerated by,
determining a media type of the flash media;
identifying a damaged file system component; and
employing the lookup table containing the file system parameters to rebuild the file system component based on the media type of the flash media; and
rewriting the corrupted portion(s) of the flash media with the rebuild data.

15. The apparatus of claim 14, wherein the flash media comprises one of a CompactFlash device, SmartMedia card, MultiMediaCard, Secure Digital card and Sony Memory Stick-compatible device.

16. The apparatus of claim 14, wherein the damaged file system component includes one of a master boot record, disk boot record or root directory.

17. The apparatus of claim 14, wherein execution of the instructions by the controller further perform the operation of detecting an activation event corresponding to a request for regenerating corrupted media, and regenerating the flash media in response thereto.

18. The apparatus of claim 14, further comprising a display means operatively coupled to the controller by which information can be displayed to a user.

* * * * *